US009363285B2

(12) United States Patent
Kitamura

(10) Patent No.: US 9,363,285 B2
(45) Date of Patent: Jun. 7, 2016

(54) COMMUNICATION SYSTEM, NETWORK FOR QUALIFICATION SCREENING/SETTING, COMMUNICATION DEVICE, AND NETWORK CONNECTION METHOD

(75) Inventor: Hiroshi Kitamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 831 days.

(21) Appl. No.: 11/651,030

(22) Filed: Jan. 9, 2007

(65) Prior Publication Data

US 2007/0174381 A1    Jul. 26, 2007

(30) Foreign Application Priority Data

Jan. 25, 2006  (JP) .................................. 2006-015749

(51) Int. Cl.
*H04L 29/06* (2006.01)
(52) U.S. Cl.
CPC ......... *H04L 63/1441* (2013.01); *H04L 63/0272* (2013.01)
(58) Field of Classification Search
USPC .......................... 709/225, 229; 726/1, 22, 26
See application file for complete search history.

(56) References Cited

U.S. PATENT DOCUMENTS

| | | | | |
|---|---|---|---|---|
| 5,914,938 A * | 6/1999 | Brady | ............... | H04L 29/12009 370/254 |
| 6,892,241 B2 * | 5/2005 | Kouznetsov | ........ | H04L 63/0227 709/203 |
| 7,010,807 B1 * | 3/2006 | Yanovsky | ............. | H04L 63/145 726/1 |
| 7,428,746 B2 * | 9/2008 | Engle et al. | ....................... | 726/1 |
| 7,631,064 B1 * | 12/2009 | Gray | ................... | H04L 12/2697 709/223 |
| 2002/0107961 A1 * | 8/2002 | Kinoshita | ........... | H04L 63/0272 709/225 |
| 2003/0055962 A1 * | 3/2003 | Freund | ................ | H04L 63/0263 709/225 |
| 2003/0055994 A1 * | 3/2003 | Herrmann | ........... | H04L 12/2856 709/229 |
| 2005/0172142 A1 * | 8/2005 | Shelest | ................. | G06F 21/577 713/191 |

(Continued)

FOREIGN PATENT DOCUMENTS

| | | |
|---|---|---|
| JP | 2004-213632 | 7/2004 |
| JP | 2005-216253 | 8/2005 |
| WO | 2006/003914 | 1/2006 |

OTHER PUBLICATIONS

VPN, obtained from the Internet at http://en.wikipedia.org/wiki/Virtual_private_network on Jan. 15, 2010, pp. 1.*

(Continued)

*Primary Examiner* — Backhean Tiv
(74) *Attorney, Agent, or Firm* — Young & Thompson

(57) ABSTRACT

The present invention provides a network connection method which prevents connection by virus-infected communication devices or communication devices intended for unauthorized access to a network, and enables connection to the network in a simple manner. A user of a requestor communication device connects to a main network by inserting a cable of the communication device to a port of a network device. When the requestor communication device is connected one-on-one to a reception box by a check-in network inside the network device, check-in is performed using the reception box. When the reception box determines through check-in processing that the requestor communication device satisfies connection qualifications, the reception box switches the network, to which the requestor communication device will be connected, from the check-in network to the main network. The requestor communication device then makes a transition to actual use of the main network.

56 Claims, 20 Drawing Sheets

(56) References Cited

U.S. PATENT DOCUMENTS

| | | | | |
|---|---|---|---|---|
| 2005/0273853 A1* | 12/2005 | Oba | ........................ | H04L 41/28 726/22 |
| 2006/0077975 A1* | 4/2006 | Huang | ................. | H04L 12/4645 370/389 |
| 2007/0055752 A1* | 3/2007 | Wiegand | ................. | H04L 67/14 709/220 |
| 2007/0101405 A1* | 5/2007 | Engle | ................. | H04L 63/0272 726/4 |
| 2007/0174381 A1* | 7/2007 | Kitamura | ............ | H04L 63/1441 709/200 |

OTHER PUBLICATIONS

Akira Yoshida, et al., "Prevent Virus Invasion from Laptops," Nikkei Internet Solutions, No. 77, pp. 77-90, Nikkei Business Publications, Inc., Nov. 22, 2003.

Yoshitaka Ichikawa, et al., "Realization of a User Authentication VLAN Client by a Signed Applet," Computer & Network LAN, vol. 20, No. 7, pp. 93-100, Ohmsha, Ltd., Jul. 1, 2002.

Japanese Patent Office issued a Japanese Office Action dated Feb. 9, 2010, Application No. 2006-015749.

* cited by examiner

COMMUNICATION SYSTEM, NETWORK FOR QUALIFICATION SCREENING/SETTING, COMMUNICATION DEVICE, AND NETWORK CONNECTION METHOD

BACKGROUND OF THE INVENTION

1. Field of the Invention

The present invention relates to a communication system, a network for qualification screening/setting, a communication device, as well as a network connection method, and a qualification screening tool program used therefor. In particular, the present invention relates to a method for preventing connection to a network by a communication device infected by a virus or a communication device used to attempt unauthorized access and the like.

2. Description of the Prior Art

The recent widespread availability of personal computers (hereinafter referred to as PCs) and the Internet has led to the rapid enhancement of the significance of networks as socio-economic and socio-productive infrastructures. Unfortunately, the growing importance of networks as socio-economic and socio-productive infrastructures has led to an increase in attacks to networks in such forms as intentional distribution of viruses and unauthorized access to networks.

While viruses were conventionally spread to PCs and the like by storage media or e-mail, or via malicious web pages or web pages that have been vandalized through unauthorized access, there has been a recent proliferation of network viruses that are spread by merely connecting to the Internet.

As a result, there have been reports of damages caused when, for instance, a network PC, which is carried outside of the network and becomes infected with a virus when connecting to the Internet, spreads the virus to the entire network upon returning and reconnecting to the network while oblivious of its infection.

In such circumstances, when establishing a network, for the purpose of protecting the network not only from foreign attacks but also from contamination within the network, a quarantine network or system has been proposed involving performing a check (hereinafter referred to as quarantine processing) on a PC and the like, brought into a network from the outside, by connecting the PC and the like to a quarantine network to determine possible virus infection and whether latest patches are attached to software such as an OS (operating system), and lifting restrictions on connection to the network when it is determined to be safe (for instance, refer to Patent Document 1 (Japanese Patent Laid-Open No. 2005-216253)).

BRIEF SUMMARY OF THE INVENTION

However, in the above-described quarantine network or system, since a PC or the like brought into a network from the outside is connected as-is to the quarantine network, in the event that a virus-infected device is connected to the quarantine network, there is a risk that devices simultaneously connected to the quarantine network may become infected by the virus.

Additionally, a problem exists in that input of an ID (identification information) or password and the like for identity verification is required when connecting devices such as a PC to a network, making such network connections a hassle. PC novices find connecting to networks particularly difficult since such connecting requires inputting settings (such as settings for the above-mentioned ID or password, or settings for network devices) for connecting to networks.

In consideration of the above, an object of the present invention is to solve the above-described problems, and provide a communication system, a network for qualification screening/setting, a communication device, as well as a network connection method used therefor which enable connection to a main network in a simple manner while preventing spreading of viruses to other devices and increase in traffic during quarantine.

A communication system according to the present invention includes a main network which provides various services, a network for qualification screening/setting provided independently from the main network, a reception control section connected to the main network and the network for qualification screening/setting, and comprises:

means of performing quarantine connection of a communication device to the reception control section via the network for qualification screening/setting when the communication device requests connection to the main network;

means of performing qualification screening, provided at the reception control section, which acquires status information of the quarantine-connected communication device to determine whether the status satisfies preset qualification requirements; and means of connecting the network, to which the communication device is connected, to the main network when it is determined that the qualification requirements are satisfied.

Another communication system according to the present invention includes a plurality of main networks which provide various services, a network for qualification screening/setting provided independently from the plurality of main networks, a reception control section connected to the main networks and the network for qualification screening/setting, and comprises:

means of performing quarantine connection of a communication device to the reception control section via the network for qualification screening/setting when the communication device requests connection to the main networks;

means of performing qualification screening, provided at the reception control section, which acquires status information of the quarantine-connected communication device to determine whether the status satisfies preset qualification requirements; and means of selectively connecting the network, to which the communication device is connected, to any one of the plurality of main networks according to the qualification requirements when it is determined that the qualification requirements are satisfied.

A network for qualification screening/setting according to the present invention, provided independently from a main network which provides various services, is connected to a reception control section together with the main network, and comprises:

means of performing quarantine connection of a communication device to the reception control section when the communication device requests connection to the main network; and means of connecting the communication device, which is quarantine-connected to the reception control section, to the main network when it is determined that the status information of the communication device satisfies preset qualification requirements.

Another network for qualification screening/setting according to the present invention, provided independently from a plurality of main networks which provide various services, is connected to a reception control section together with the main networks, and comprises:

means of performing quarantine connection of a communication device to the reception control section when the communication device requests connection to the main networks; and means of selectively connecting the communication device, quarantine-connected to the reception control section, to one of the plurality of main networks according to the qualification requirements when it is determined that the status information of the communication device satisfies preset qualification requirements.

A communication device according to the present invention requests connection to a main network in a communication system including the main network which provides various services, a network for qualification screening/setting provided independently from the main network, and a reception control section connected to the main network and the network for qualification screening/setting, wherein the communication device is quarantine-connected via the network for qualification screening/setting to the reception control section in order to perform qualification screening on whether the device itself satisfies preset qualification requirements, and when it is determined that the qualification requirements are satisfied, the network to which the device itself is connected will be connected to the main network.

Another communication device according to the present invention requests connection to a plurality of main networks in a communication system including the main networks which provide various services, a network for qualification screening/setting provided independently from the main networks, and a reception control section connected to the main networks and the network for qualification screening/setting, wherein the communication device is quarantine-connected via the network for qualification screening/setting to the reception control section in order to perform qualification screening on whether the device itself satisfies preset qualification requirements, and when it is determined that the qualification requirements are satisfied, the network to which the device itself is connected will be selectively connected to one of the plurality of main networks according to the qualification requirements.

A network connection method according to the present invention is used in a communication system which includes a main network which provides various services, a network for qualification screening/setting provided independently from the main network, a reception control section connected to the main network and the network for qualification screening/setting, and comprises the steps of:

performing quarantine connection of a communication device to the reception control section via the network for qualification screening/setting when the communication device requests connection to the main network;

having the reception control section acquire status information of the quarantine-connected communication device to perform qualification screening in order to determine whether the status satisfies preset qualification requirements; and connecting the network, to which the communication device is connected, to the main network when it is determined that the qualification requirements are satisfied.

Another network connection method according to the present invention is used in a communication system which includes a plurality of main networks which provide various services, a network for qualification screening/setting provided independently from the main networks, a reception control section connected to the main networks and the network for qualification screening/setting, and comprises the steps of:

performing quarantine connection of a communication device to the reception control section via the network for qualification screening/setting when the communication device requests connection to the main networks;

having the reception control section acquire status information of the quarantine-connected communication device to perform qualification screening in order to determine whether the status satisfies preset qualification requirements; and selectively connecting the network, to which the communication device is connected, to one of the main networks according to the qualification requirements when it is determined that the qualification requirements are satisfied.

A program for a network connection method according to the present invention is used in a communication system which includes a main network which provides various services, a network for qualification screening/setting provided independently from the main network, a reception control section connected to the main network and the network for qualification screening/setting, and comprises:

performing quarantine connection of a communication device to the reception control section via the network for qualification screening/setting when the communication device requests connection to the main network; and having a computer of the reception control section acquire status information of the quarantine-connected communication device to perform qualification screening in order to determine whether the status satisfies preset qualification requirements, and connect the network, to which the communication device is connected, to the main network when it is determined that the qualification requirements are satisfied.

Another program for a network connection method according to the present invention is used in a communication system which includes a plurality of main networks which provide various services, a network for qualification screening/setting provided independently from the main networks, a reception control section connected to the main networks and the network for qualification screening/setting, and comprises:

performing quarantine connection of a communication device to the reception control section via the network for qualification screening/setting when the communication device requests connection to the main networks; and having a computer of the reception control section acquire status information of the quarantine-connected communication device to perform qualification screening in order to determine whether the status satisfies preset qualification requirements, and selectively connect the network, to which the communication device is connected, to one of the main networks according to the qualification requirements when it is determined that the qualification requirements are satisfied.

A qualification screening tool program according to the present invention is used in a communication system which includes a main network which provides various services, a network for qualification screening/setting provided independently from the main network, and a reception control section connected to the main network and the network for qualification screening/setting, in order to perform qualification screening on whether a communication device requesting connection to the main network satisfies preset qualification requirements, wherein the qualification screening tool program causes a computer of the communication device to perform the processing of: confirming a link state when the communication device is quarantine-connected to the reception control section via the network for qualification screening/setting; confirming the network for qualification screening/setting; and acquiring qualification screening information for qualification screening from the communication device and transmitting the information to the reception control section.

In other words, in a communication system which logically groups communication devices connected to a network (hereinafter referred to as a main network) that provides various services, the network connection method according to the present invention provides a network (hereinafter referred to as a network for qualification screening/setting) that is provided independently from the main network and verifies whether a communication device requesting connection to the main network satisfies preset connection requirements (qualification requirements). The network connection method uses a reception control section, connected to both the main network and the network for qualification screening/setting, to perform verification of connection requirements of the requestor communication device that is requesting connection to the main network by quarantine-connecting the communication device via the network for qualification screening/setting.

Therefore, according to the network connection method of the present invention, by having the reception control section verify connection requirements of a requestor communication device that is quarantine-connected via the network for qualification screening/setting, connection to the main network may be performed in a simple manner even in the event that a communication device infected by a virus or a communication device used to attempt unauthorized access is connected to the network for qualification screening/setting, while preventing spreading of viruses from such devices to other quarantined devices and preventing increase in traffic during quarantine.

In addition, according to the network connection method of the present invention, by having the requestor communication device confirm a connection destination when connection to a verification network is detected upon connecting (hereinafter referred to as Plug and Play) its own cable to a network device (such as a hub) which enables connection to the network for qualification screening/setting, and transmitting an SLP (Service Location Protocol) query to the reception control section of the confirmed connection destination, Service Discovery (configuration enabling automatic discovery of required information) is performed to exchange various information which vary according to used communication environments.

At this stage, according to the network connection method of the present invention, since the reception control section performs autoconfiguration of name and ID (identification information) of the requestor communication device and connects the network, to which the requestor communication device is connected, to the main network when the requestor communication device satisfies preset qualification requirements (for instance, when the device satisfies qualification requirements, such as a state in which newest patches are applied and antivirus measures are in place), a user of the requestor communication device will now be able to connect to the main network by merely connecting the cable to the network device if qualification requirements are satisfied or when performing autoconfiguration so as to satisfy such qualification requirements.

Furthermore, according to the network connection method of the present invention, in a state in which the reception control section and the requestor communication device are connected to the network for qualification screening/setting, the reception control section, as a representative of each device connected to the main network, either provides the communication device with key information for verifying using an electronic signature function whether information acquired by the main network is from a proper device (use of a KDC [Key Distribution Center] model), or provides the reception control section with key information for verifying using an electronic signature function whether information to be transmitted by the communication device to the main network is truly from the communication device. This enables verification using the key information of whether information of a service is proper information when such services are detected from a main network to which connection is made via Plug and Play.

In this case, when using a directory server (DA: Directory Agent) to which information on devices connected to the main network is registered, a mechanism may be constructed for verifying that the information is from a proper directory server. This mechanism newly provides a service for acquiring a public key of the directory server as a simple mechanism that is necessary and sufficient. Acquisition and verification of the public key of the directory server is performed only once at the beginning, and acquisition and verification of general service information may be performed using the public key.

Moreover, according to the network connection method of the present invention, when the cable of the requestor communication device is disconnected from the network device, verification of qualification requirements of a communication device to be next connected to the network device may be performed by the reception control section in a state in which quarantine-connection is made to the reception control section by configuring the network device so that switching to the main network is returned to its original state (returned to connection to the network for qualification screening/setting).

According to the network connection method of the present invention, processing of the used requestor communication device is performed in the following sequence.

(1) Pre-processing for using main network (user agreement and the like)
(2) Connection of cable to a network device (hub and the like)
(3) Check-in processing for using the reception control section (Reception box)
(4) Actual use of the main network (Plug-into the main network)
(5) Disengagement of cable from the network device (Plug-out from the main network)
(6) Check-out for departure from use of reception control section
(7) Termination of use of the main network While the above description assumes that a verification software (qualification screening tool program) is installed (Bootstrap: tool installer) in order to have a requestor communication device perform the processing of (2) to (7), it is also possible to have a requestor communication device connect to a download site for the verification software upon issuance of a new connection request by the communication device to download and install the verification software.

In this case, the communication device must at least be installed with a web browser. When a cable of the communication device is connected to a network device and the Web browser accesses an arbitrary website, the reception control section performs redirection to guide the access to the download site for the verification software, and arranges the verification software to be downloaded from the download site onto the communication device. As a result, according to the network connection method of the present invention, new introduction of various tools (software) may be arranged to be performed in a simple and compulsory manner, thereby enabling resolution of the prerequisite problem in that various tools must be installed when service is provided.

Therefore, according to the network connection method of the present invention, for connection monitoring (L2 [Layer 2] state monitoring) to a network device, which is a series of processing in a sequence of: L2 to L3 (Layer 3), and L3 to application, since a status change of L2 is used as a trigger for operation, processing may be concluded by merely plugging a cable to a network device, which is a simple operation that anybody can perform.

In this case, by using the verification software, the communication device-side may perform auto-detection of stage changes/switchovers of a VLAN (Virtual LAN [local area network]) or a VPN (Virtual Private Network), in addition to detection of status changes of links (linkUp/linkDown) using the same port. A network device (for example, a hub) performs switching of a VLAN or VPN according to status changes of a link (linkUp/linkDown). Devices operable under a protocol called SNMP (Simple Network Management Protocol) may be considered as network devices.

According to the network connection method of the present invention, when exchange of key information with the communication device is performed after the reception control section performs the above-described processing, since it is now possible to establish a VPN tunnel between a home gateway to be connected to the main network using the key information acquired by the communication device when connecting from an external network (foreign link), the communication device is now able to connect to the main network from the outside in a safe and simple manner.

The following operations are performed at the communication device-side.

(1) Connection to the network for qualification screening/setting (Check-in Network) is always established immediately following plug-in to a network device. In this case, if the communication device does not satisfy requirements (for instance, not yet quarantined), the messages "Quarantine" and "Register" are notified. If the communication device satisfies requirements (for instance, already quarantined), the VLAN or VPN is switched to the main network to enable use of the same and allow information to be provided from the main network.

(2) When unplugging the cable from the network device, the relevant port is connected to the network for qualification screening/setting through auto-detection.

(3) When a problem occurs (when a worm is found), all ports are connected to the network for qualification screening/setting.

As described above, according to the network connection method of the present invention, demonstration and the like of execution of IPv6 (Internet Protocol version 6) rapid service discovery up to execution of applications may now be performed by simply plugging the cable into the network device. This opens the way for development of a system for constructing a communication environment in which operations are guided and devices are configured unerringly in one simple operation. Therefore, even initialization of devices is automatically performed without requiring the user to contemplate what to do and when, and acquired information may be verifiable as to whether such information is trustworthy. In doing so, it is now possible to automatically perform quarantine on virus-infected devices or unauthorized devices in a compulsory manner without having such devices enter the main network. Obviously, this prevents spreading of viruses or increase in traffic regarding other devices simultaneously connected to the same network device.

According to the network connection method of the present invention, a wide variety of service information (camera information, VPN [Virtual Private Network] information, net status information, key and the like) may be targeted, enabling keys requiring confidentiality to be exchanged in a simple and safe manner via a control server device. In addition, the network connection method of the present invention supports various types (passive/active) of IP (Internet Protocol) devices. Passive devices that do not allow autonomous service search include wireless LAN (Local Area Network) APs (Access Points) such as routers or information appliances and the like, while active devices that allow autonomous service search include notebook PCs (Personal Computers) and PDAs (Personal Digital Assistants).

Furthermore, the network connection method according to the present invention enables a hybrid authentication which combines automatic quarantine in which the reception control section and a communication device are quarantine-connected on a one-on-one basis by the network for qualification screening/setting, and human authentication capable of monitoring terminal use by suspicious individuals. Even in this case, a user is no longer required to input a password when connecting to the network, and may perform network connection in a safe and simple manner.

By arranging the present invention to be configured and to operate as described above, an advantage may be gained in that connection to a main network may be performed in a simple manner while preventing spreading of viruses to other devices and increase in traffic during quarantine.

DETAILED DESCRIPTION OF THE PREFERRED EMBODIMENT

Figure 1:
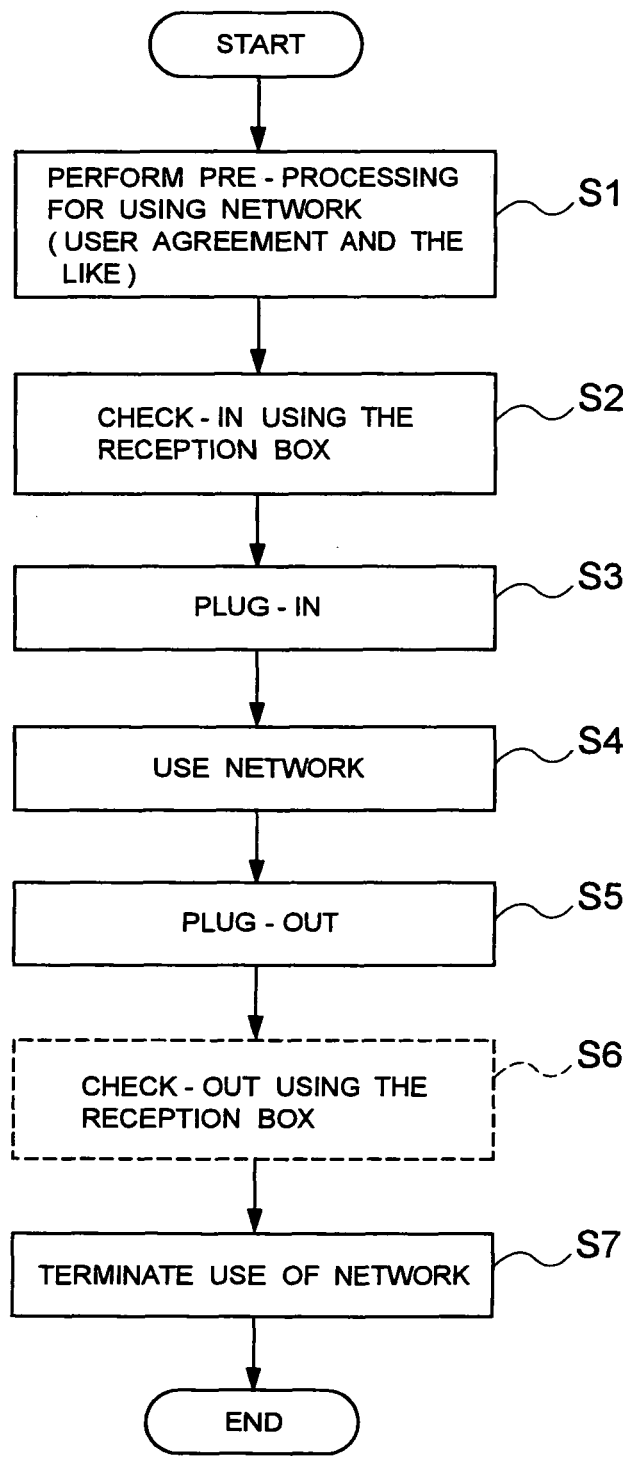
FIG. 1 is a flowchart showing operations of a communication system according to an embodiment of the present invention.

An embodiment of the present invention will now be described with reference to the drawings. FIG. 1 is a flowchart showing operations of a communication system according to an embodiment of the present invention. A description of operations of a communication device in a communication system according to an embodiment of the present invention will now be provided with reference to FIG. 1.

It is assumed that a home link, to which a connection request by the communication device is directed, comprises a main network that provides various services and a check-in network (network for qualification screening/setting) for verifying whether the requestor communication device satisfies preset connection requirements, and that a reception box (reception control section) for performing verification on whether such connection requirements are met is quarantine-connected on a one-on-one basis to the requestor communication device by the check-in network, thereby ensuring that the requestor communication device is not accessed by other devices connected to the same check-in network. In addition, the main network and the check-in network form a VLAN (Virtual LAN [local are a network] or a VPN (virtual private network).

A user of the requestor communication device performs pre-processing for using the main network (user agreement and the like) in advance (step S1 in FIG. 1). Then, when connecting to the main network, the user inserts a cable of the communication device into a port of a network device (for instance, a hub) to connect to the check-in network.

The requestor communication device is quarantine-connected to the reception box on a one-on-one basis by the check-in network inside the network device. In this case, even if other devices are connected to the network device, such devices will be able to neither recognize nor access the requestor communication device connected to the network device.

When the requestor communication device is quarantine-connected on a one-on-one basis to the reception box, check-in is performed using the reception box (step S2 in FIG. 1). More specifically, check-in processing is performed in order to verify whether the requestor communication device, quarantine-connected on a one-on-one basis to the reception box, is not a virus-infected communication device or a communication device intended for unauthorized access, as well as to verify whether preset connection requirements are satisfied.

In this case, the reception box provides the requestor communication device with data for performing verification, acquires results of executing the data (whether the device is infected with a virus or spyware and the like) and information regarding the requestor communication device itself (information regarding OS [operation system] and patches applied thereto, version information of antivirus software, information regarding application software to be mounted or the like), and verifies whether preset qualification requirements (requirements of whether the requestor communication device is qualified to connect to the main network) are satisfied based on the acquired information. Qualification requirements may include, for instance, non-infection to viruses or spyware, installation of at least a Web browser and antivirus software, and application of newest patches thereon.

In addition, by exchanging key information for verifying using an electronic signature function whether information acquired by the requestor communication device is proper information in a state in which the requestor communication device is connected via the check-in network (use of a KDC [Key Distribution Center] model), the reception box is able to perform verification of whether information of services provided from the main network, connected via plug-and-play, is proper information using the key information.

In this case, according to the embodiment of the present invention, when using a directory server (DA: Directory Agent) to which information on devices connected to the main network is registered, a mechanism may be constructed for verifying that the information is from a proper directory server. This mechanism newly provides a service for acquiring a public key of the directory server as a simple mechanism that is necessary and sufficient. Acquisition and verification of the public key of the directory server is performed only once at the beginning, and acquisition and verification of general service information may be performed using the public key.

When the reception box determines through the above-mentioned check-in processing that the requestor communication device satisfies connection requirements, the reception box causes the network device to switch the network (plug-in), to which the requestor communication device is connected, from the check-in network to the main network (step S3 in FIG. 1). Subsequently, the requestor communication device makes a transition to actual use of the main network (step S4 in FIG. 1).

If exchange of key information is performed as described above when the requestor communication device makes its transition to actual use of the main network, the requestor communication device will be able to search as to what kind of services are available from the main network, and verify whether searched service information is proper by means of an electronic signature function using the key information. When the service information is proper, the requestor communication device will use the service information to use the relevant service.

In addition, if exchange of key information is performed as described above, when terminating use of the main network and connecting to the above-mentioned main network from another network, the requestor communication device will be able to establish a VPN (Virtual Private Network) tunnel between the other network and the main network using the key information.

When terminating actual use of the main network, the user of the requestor communication device detaches (plug-out) its cable from the network device to disconnect from the main network (step S5 in FIG. 1). In this case, since the connection of the requestor communication device to the main network is terminated, the reception box performs check-out which returns configuration of the network device to its original settings, or in other words, the setting in which quarantine-connection to the reception box via the check-in network is performed when a cable is inserted (step S6 of FIG. 1).

In other words, when the cable of the requestor communication device is disconnected from the network device in the check-out processing, the reception box performs processing which restores the network device to a setting in which, when a cable of a communication device is inserted to a port of the network device, the network to which the communication device of the cable is connected will be the check-in network. As a result, the reception box arranges a communication device that is next connected to the network device to be first connected to the check-in network.

After performing the above-described processing, the user of the requestor communication device terminates use of the main network (step S7 in FIG. 1). Processing of the requestor communication device using the main network is performed according to the processing flow described above. Therefore, according to the embodiment of the present invention, even in the event that a communication device infected by a virus or a communication device used to attempt unauthorized access and the like is connected to the check-in network, a quarantine state which prevents access to other devices may be established, thereby allowing connection of proper communication devices to the main network to be performed in a simple manner. At the same time, spreading of viruses or increases in traffic from the above-mentioned virus-infected communication device or a communication device used to attempt unauthorized access and the like to other devices simultaneously connected to the network device may be prevented.

FIRST EXAMPLE

Figure 2:
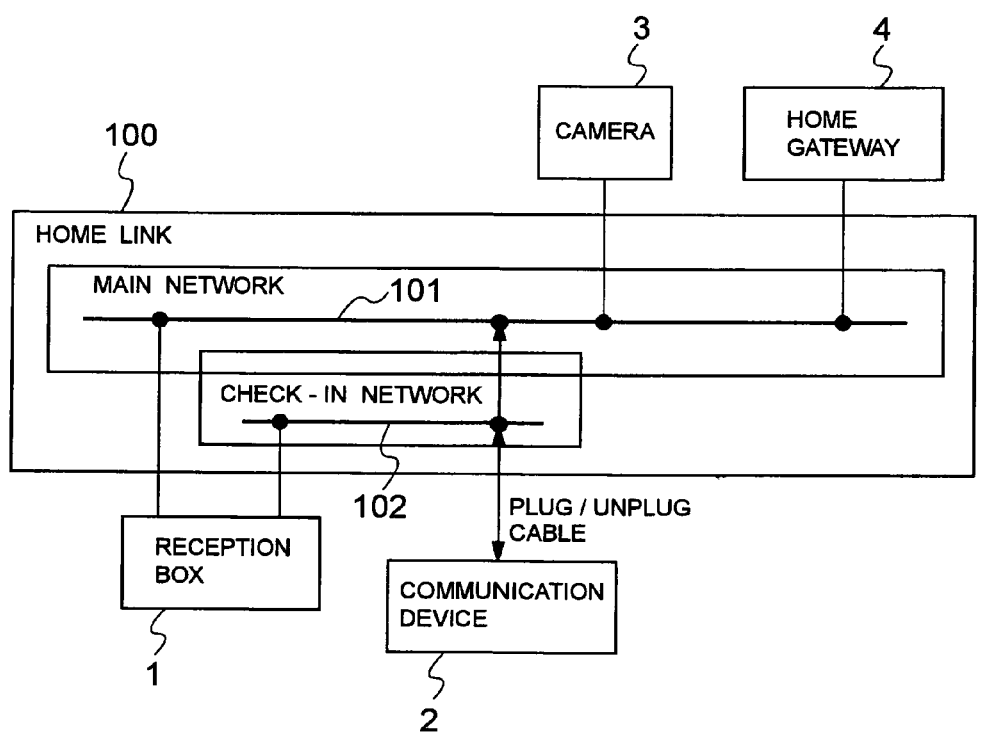
FIG. 2 is a block diagram showing a configuration of a communication system according to a first example of the present invention.

FIG. 2 is a block diagram showing a configuration of a communication system according to a first example of the present invention. As shown in FIG. 2, the communication system according to the first example of the present invention comprises a reception box 1, a communication device 2, a camera 3, a home gateway 4, and a home link 100. The home link 100 includes a main network 101 and a check-in network 102. While the main network 101 and the check-in network 102 will be hereafter described as a VLAN, a VPN may be formed instead, and the arrangement of the networks is not limited to these examples.

Figure 3:
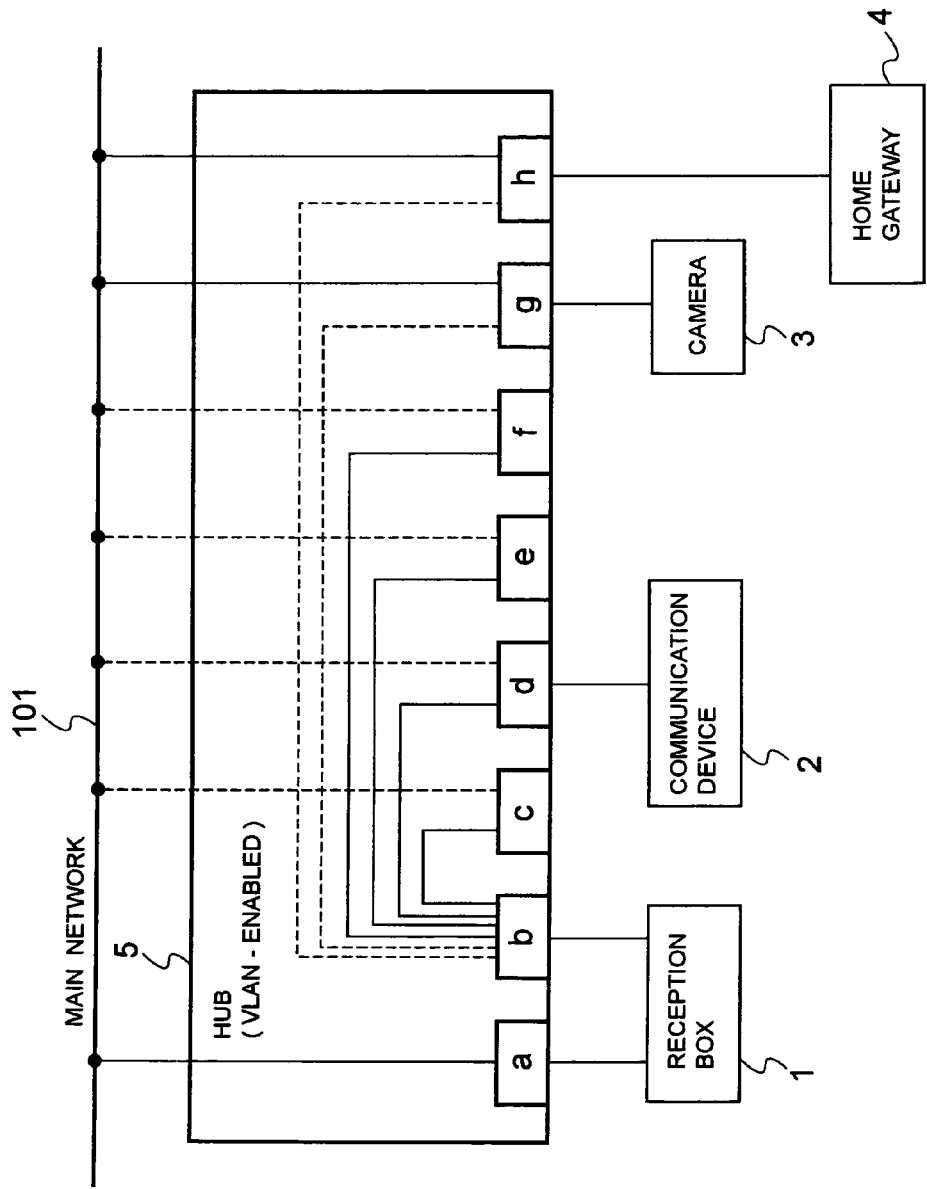
FIG. 3 is a block diagram showing a connection status of a reception box and a communication device shown in FIG. 2.

FIG. 3 is a block diagram showing a connection status of the reception box 1 and the communication device 2 shown in FIG. 2. As shown in FIG. 3, a hub (VLAN-enabled) 5 is provided with ports "a" to "h". The reception box 1 is connected to the main network 101 via port "a" and to the check-in network 102 via port "b". The present example is applicable to network devices other than hubs (such as routers and the like). In addition, the network device operates under a protocol such as SNMP (Simple Network Management Protocol) and the like.

Ports "c" to "h" are arranged to switchover devices connected thereto between connection to the main network 101 and one-on-one connection to port "b" via the check-in network 102. As a result, one-on-one quarantine connection may be established between the reception box 1 connected to port "b" and a communication device connected to any of the ports "c", to "h". In this case, the hub 5 is incapable of mutually connecting communication devices respectively connected to ports "c" to "h". FIG. 3 shows a state in which the communication device 2 connected to port "d" is quarantine-connected on a one-on-one basis to the reception box 1 connected to port "b". Since connection requirement checks (qualification screening) of the camera 3 and the home gateway 4, respectively connected to ports "g" and "h", have already been-concluded by the reception box 1, the camera 3 and the home gateway 4 are connected to the main network 101.

When it is determined through the exchange of information between reception box 1 and the communication device 2 that the communication device 2 satisfies preset qualification requirements, the reception box 1 switches port "d" (VLAN switchover), to which the communication device 2 is connected, in order to connect the communication device 2 to the main network 101.

Figure 4:
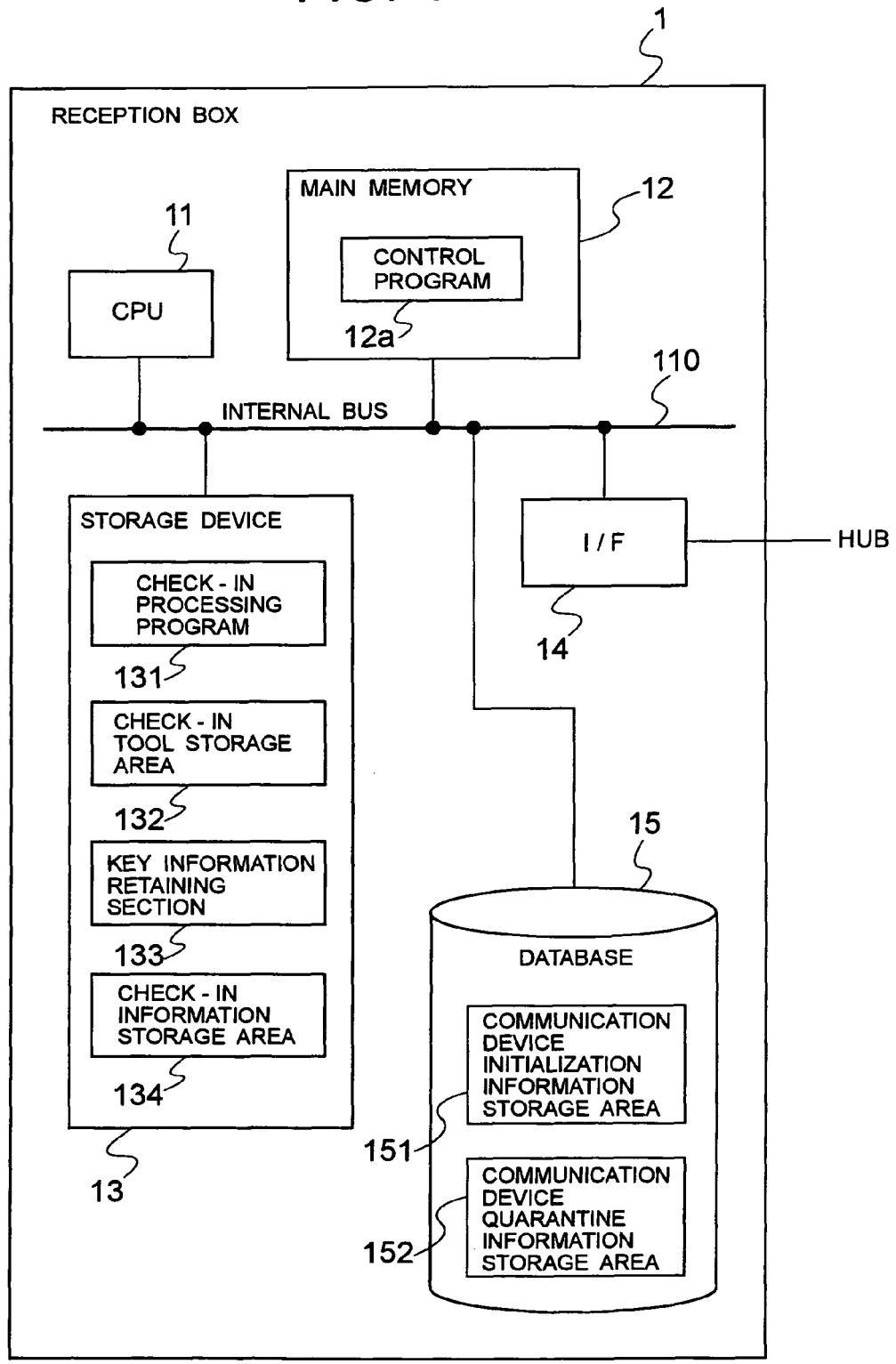
FIG. 4 is a block diagram showing a configuration of the reception box shown in FIG. 2.

FIG. 4 is a block diagram showing a configuration of the reception box 1 shown in FIG. 2. As shown in FIG. 4, the reception box 1 comprises a CPU (central processing unit) 11, a main memory 12 for storing a control program 12a to be executed by the CPU 11, a storage device 13 to be used as a work area when the CPU 11 executes the control program 12a, an I/F (interface) section 14 to be connected via a cable to the hub 5, and a database 15 for accumulating various information. The CPU 11, the main memory 12, the storage device 13, the I/F section 14 and the database 15 are respectively connected to an internal bus 110. In addition, the database 15 may be externally installed to the reception box 1.

Various information to be used by the CPU 11 is retained in the storage device 13, which is provided with a check-in processing program 131 for performing check-in processing, a check-in tool storage area 132 for storing a check-in tool to be used for check-in processing, a key in formation retaining section 133 for retaining key information, and a check-in information storage area 134. The database 15 is provided with a communication device initial information storage area 151 for storing initial information of communication devices, and a communication device quarantine information storage area 152 for storing quarantine information of communication devices.

Figure 5:
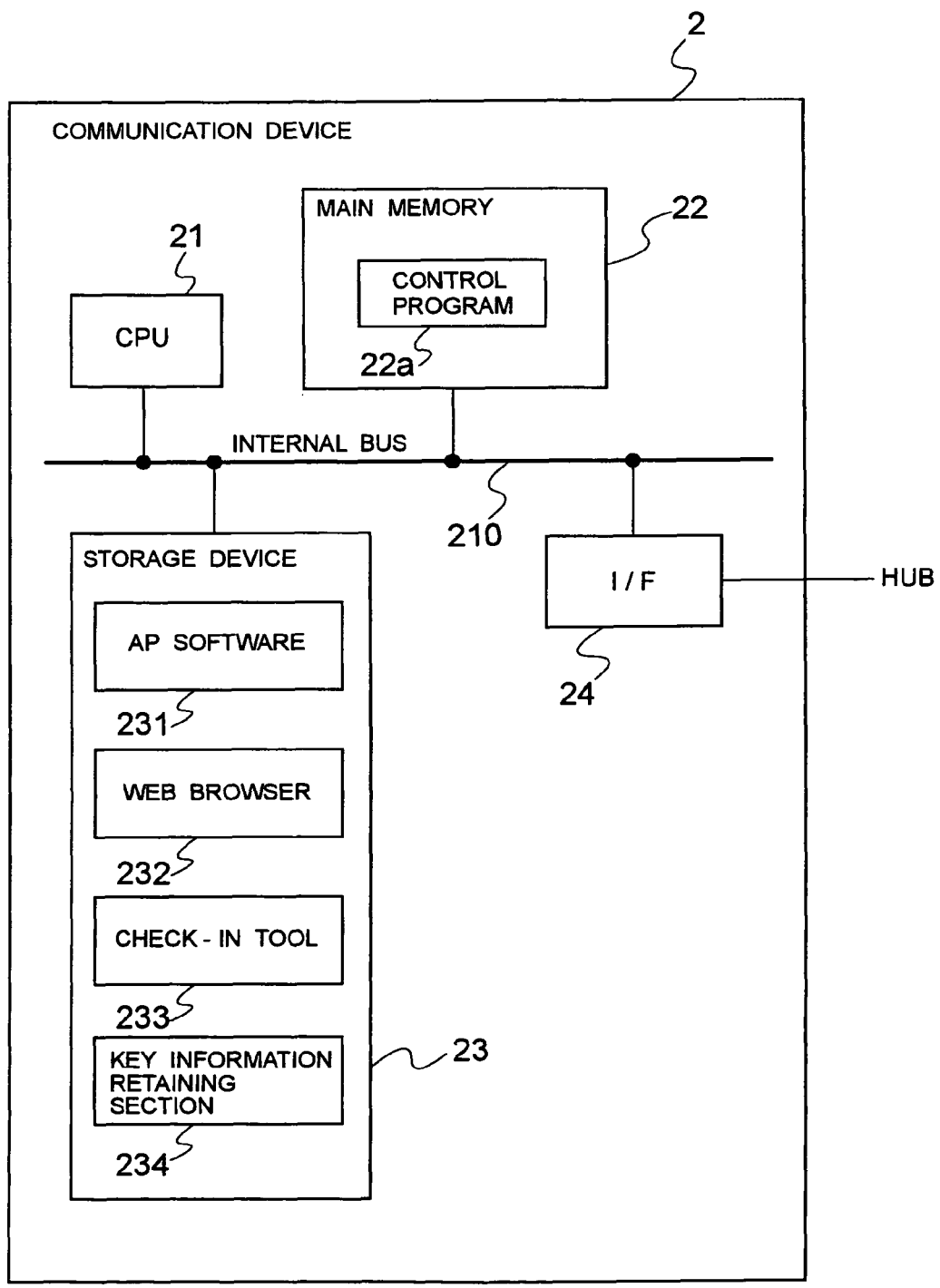
FIG. 5 is a block diagram showing a configuration of the communication device shown in FIG. 2.

FIG. 5 is a block diagram showing a configuration of the communication device 2 shown in FIG. 2. As shown in FIG. 5, the communication device 2 comprises a CPU 21, a main memory 22 for storing a control program 22a to be executed by the CPU 21, a storage device 23 to be used as a work area when the CPU 21 executes the control program 22a, and an I/F (interface) section 24 to be connected via a cable to the hub 5. The CPU 21, the main memory 22, the storage device 23, and the I/F section 24 are respectively connected to an internal bus 210.

Various information to be used by the CPU 21 is retained in the storage device 23, which is provided with an AP (application) software 231, a Web browser 232 for accessing respective sites on the Internet, a check-in tool 233 to be used for the above-described check-in processing, and a key information retaining section 234 for retaining key information.

Figure 6:
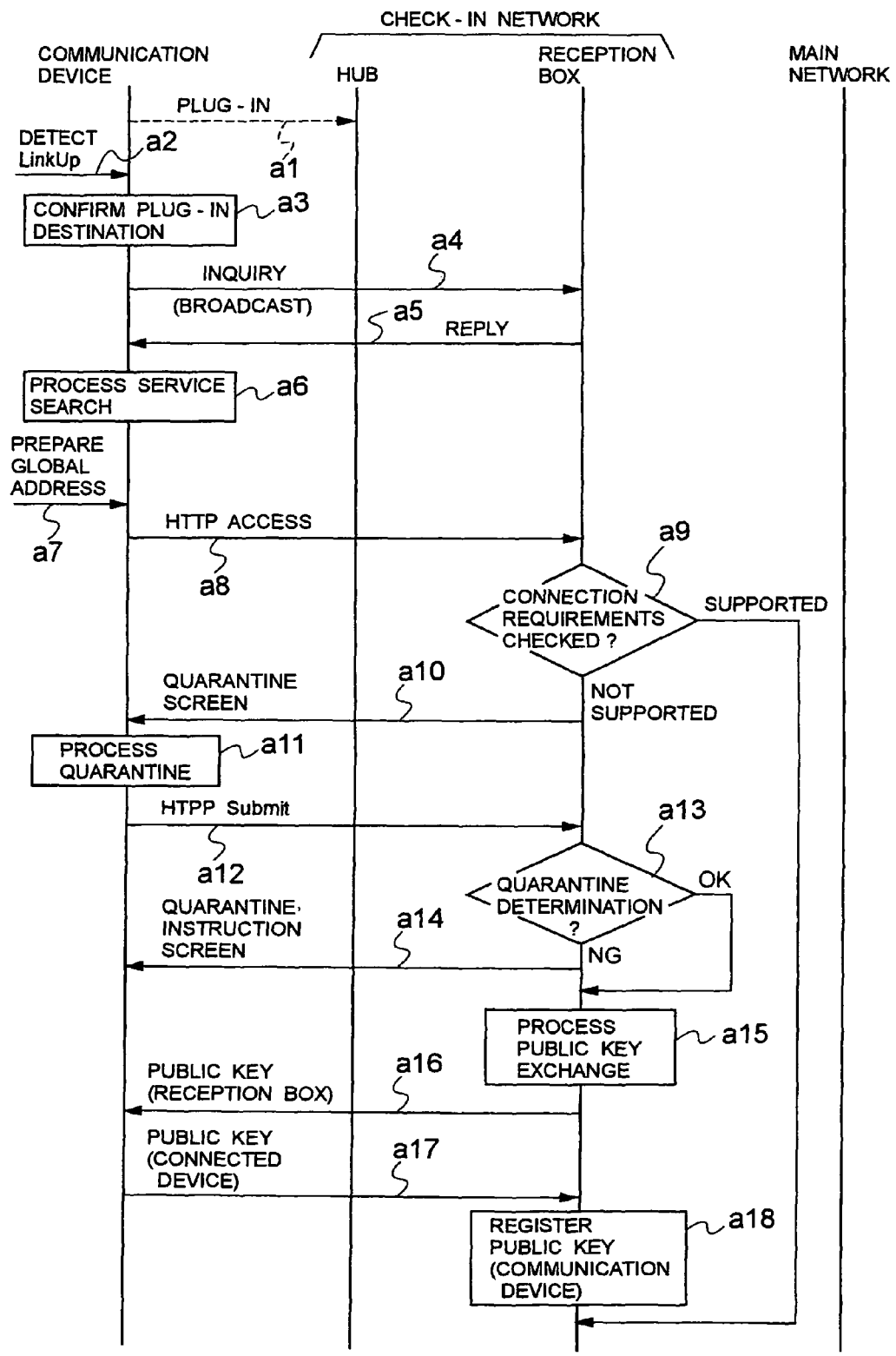
FIG. 6 is a sequence chart showing network connection processing in the communication system according to the first example of the present invention.
Figure 7:
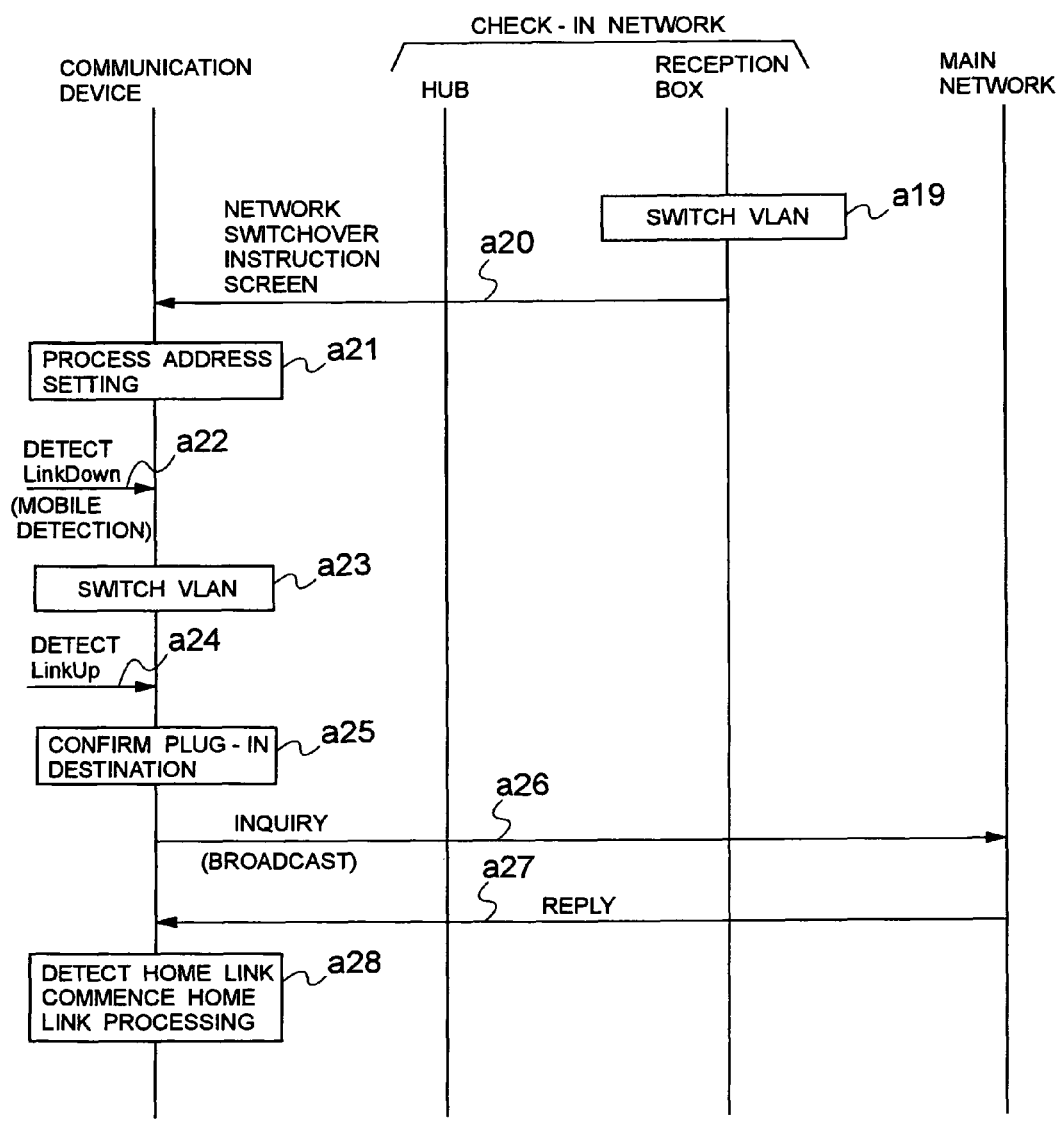
FIG. 7 is a sequence chart showing network connection processing in the communication system according to the first example of the present invention.
Figure 8:
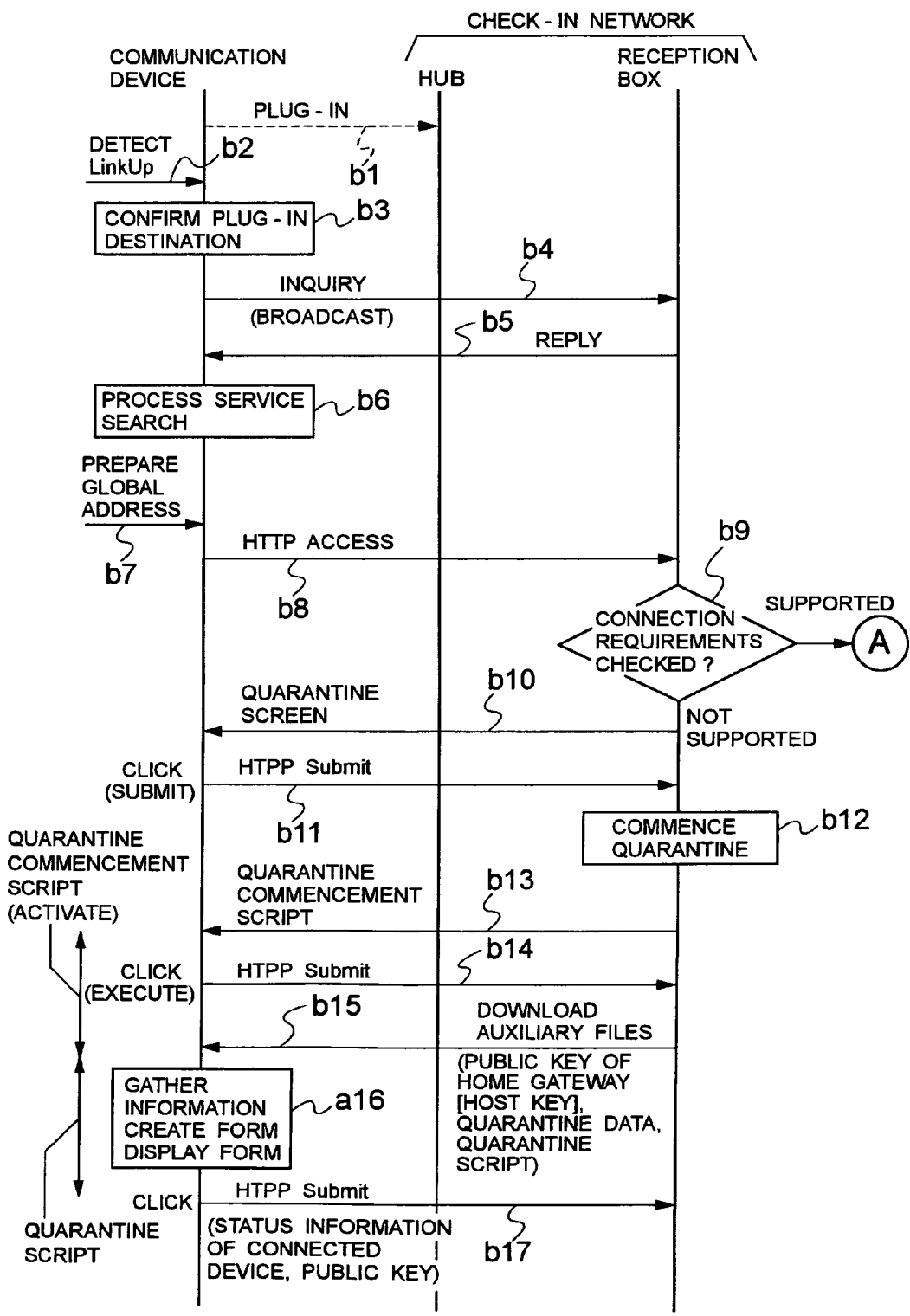
FIG. 8 is a sequence chart showing quarantine processing in the communication system according to the first example of the present invention.
Figure 9:
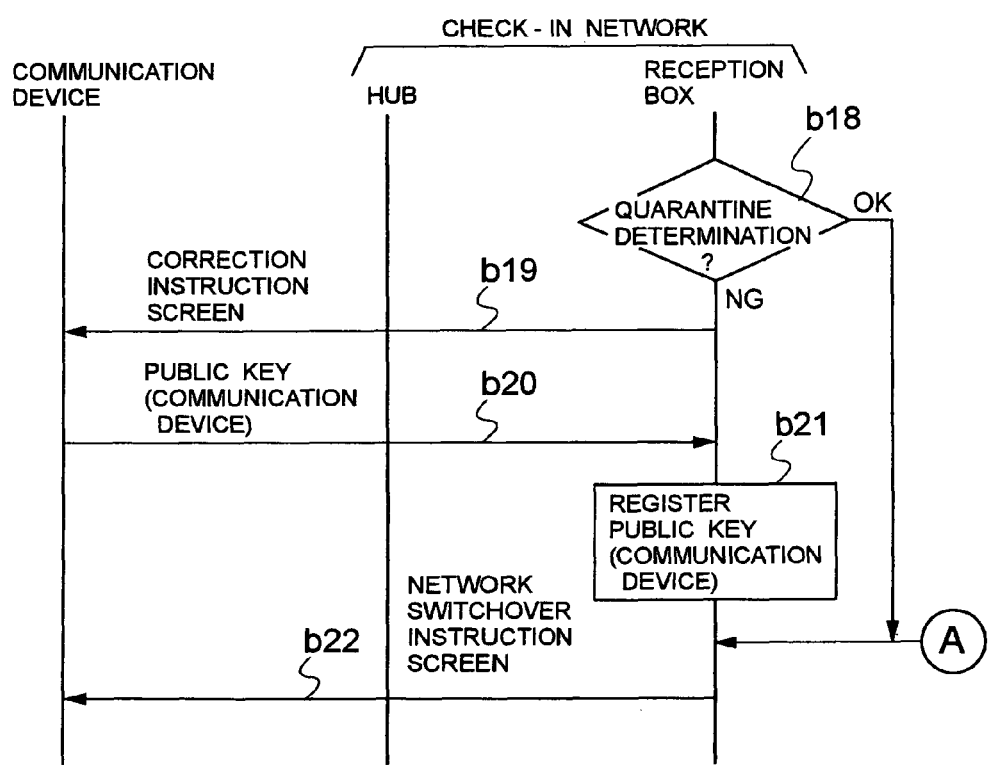
FIG. 9 is a sequence chart showing quarantine processing in the communication system according to the first example of the present invention.
Figure 10:
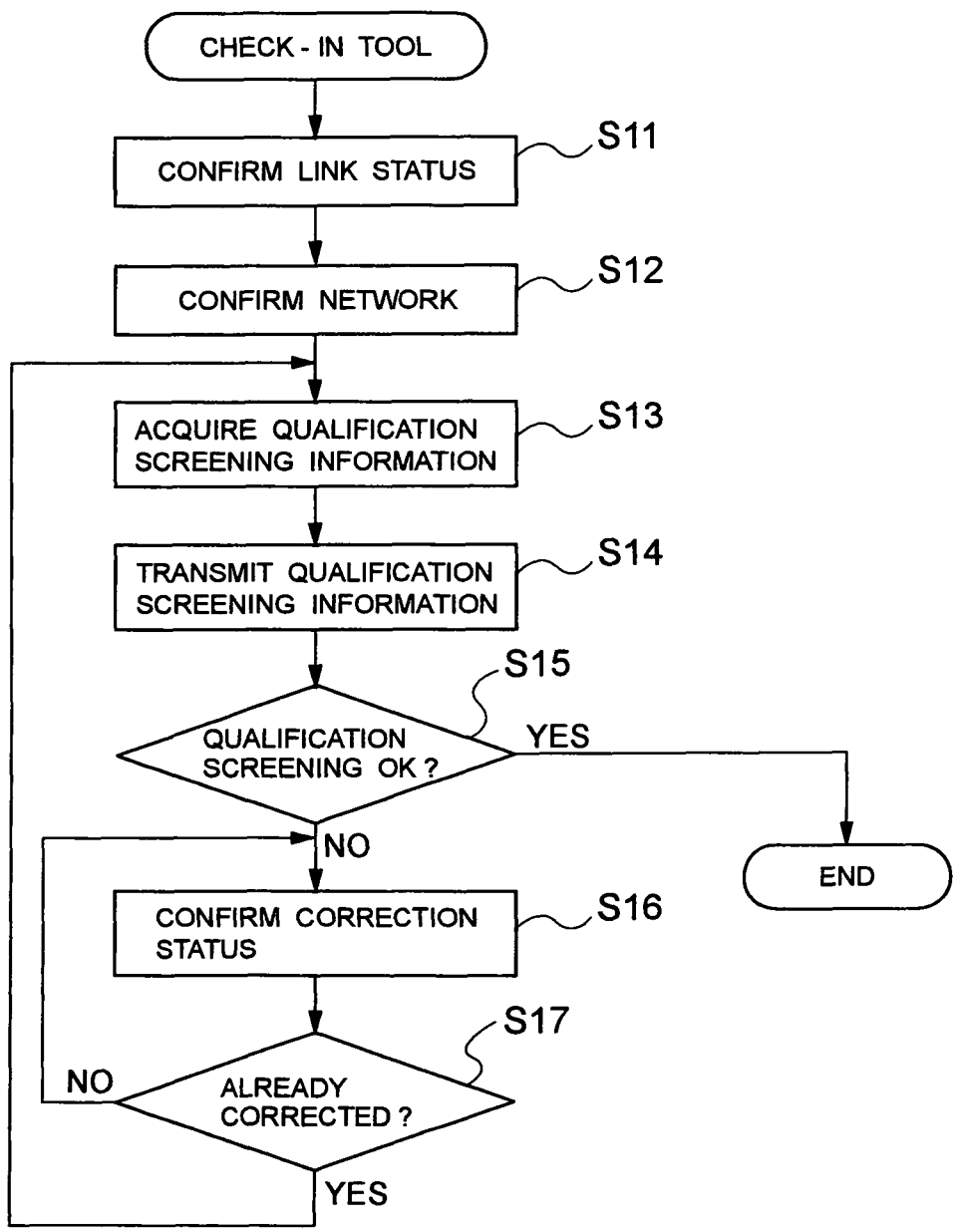
FIG. 10 is a flowchart showing processing of a check-in tool used in the communication system according to the first example of the present invention.
Figure 11:
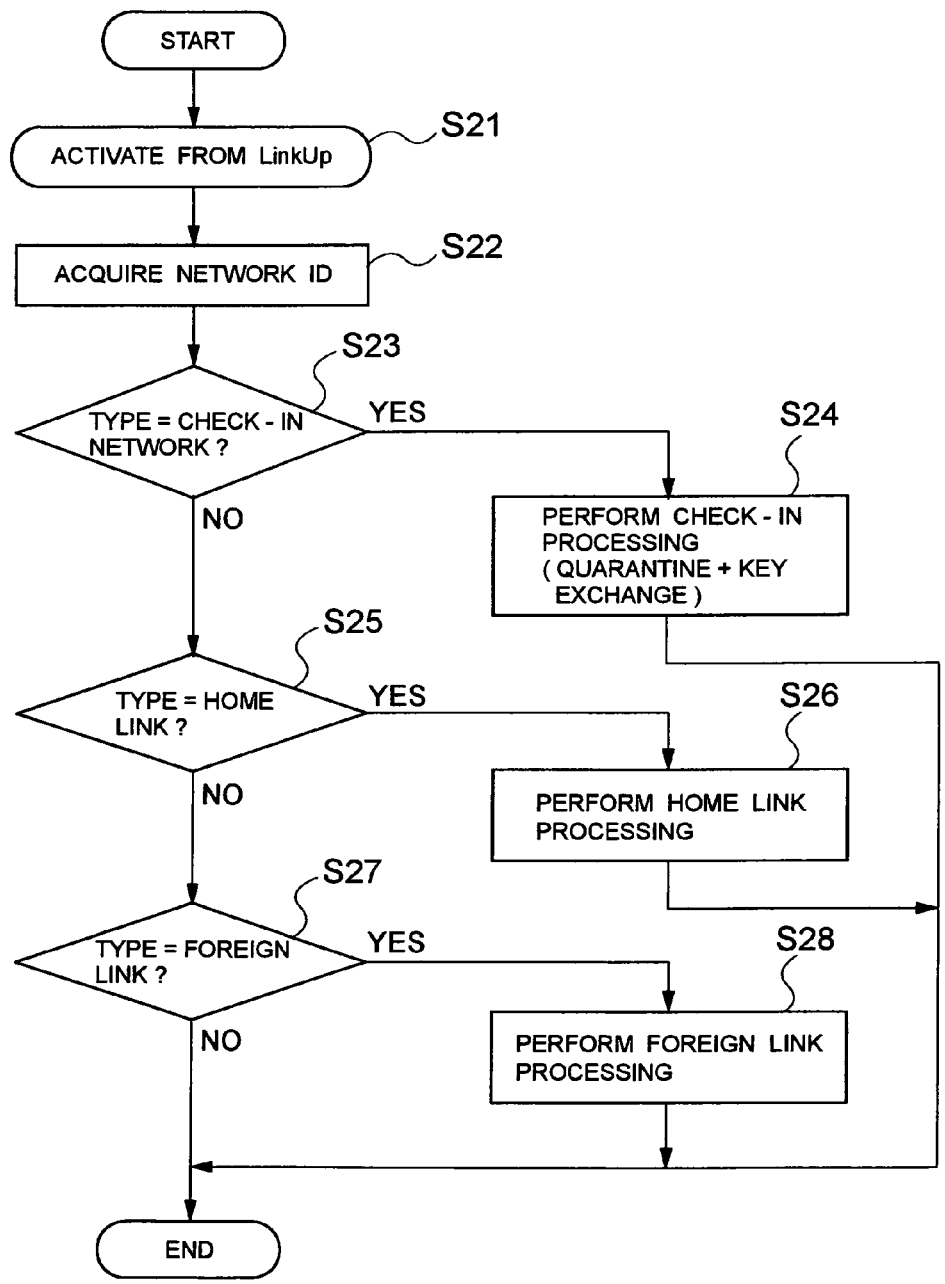
FIG. 11 is a flowchart showing processing of confirming a plug-in destination network in the communication system according to the first example of the present invention.

FIGS. 6 and 7 are sequence charts showing network connection processing in the communication system according to the first example of the present invention. FIGS. 8 and 9 are sequence charts showing quarantine processing in the communication system according to the first example of the present invention. FIG. 10 is a flowchart showing processing of a check-in tool used in the communication system according to the first example of the present invention, and FIG. 11 is a flowchart showing processing of confirming a plug-in destination network by the communication system according to the first example of the present invention. Operations of the communication system according to the first example of the present invention will now be described with reference to FIGS. 1 to 11. In FIGS. 6 to 9 and FIG. 11, the processing of the reception box 1 is realized by the CPU 11 by executing the control program 12a, while the processing of the communication device 2 is realized by the CPU 21 by executing the control program 22a.

At the communication device 2, when a cable is connected (plug-in to the check-in network) to port "f" of the hub 5 (refer to reference character "a1" in FIG. 6), and connection is made to the check-in network 102, the communication device 2 detects linkUp to the check-in network 102 (refer to reference character "a2" in FIG. 6), and uses the check-in tool 233 to confirm plug-in destination (refer to reference character "a3" in FIG. 6). In this case, it is assumed that the check-in tool 233 has been downloaded in advance from a download server (not shown) of the check-in tool, and is retained in the storage device 23.

The communication device 2 transmits a query request for confirming the plug-in destination to the check-in network 102 via broadcast (refer to reference character "a4" in FIG. 6). In this case, since the communication device 2 is quarantine-connected on a one-on-one basis to the reception box 1 via the check-in network 102, the reception box 1 will return a reply to the communication device 2 (refer to reference character "a5" in FIG. 6).

Upon receiving the reply, the communication device 2 executes processing for service search using an SLP (Service Location Protocol) query, an SLP reply (HTTP [Hyper Text Transfer Protocol] URL [Uniform Resource Locator]) and the like (refer to reference character "a6" in FIG. 6).

The communication device 2 prepares a global address (refer to reference character "a7" in FIG. 6), and subsequently performs an HTTP access to the reception box 1 (refer to reference character "a8" in FIG. 6). The reception box 1 performs a connection requirement check in regards to the HTTP access from the communication device 2 (refer to reference character "a9" in FIG. 6). In this case, the connection requirements are one of the types of qualification requirements described above in association with the embodiment of the present invention. Since the check performed on the connection requirements is also similar to the processing described for the above-described embodiment of the present invention, a description thereof will be omitted.

If the reception box 1 finds through the connection requirement check that the connection requirements are not supported, the reception box 1 notifies a quarantine screen to the communication device 2 (refer to reference character "a10" in FIG. 6), and arranges the communication device 2 to perform quarantine processing (refer to reference character "a11" in FIG. 6). Once quarantine processing is performed at the communication device 2 and a processing result (HTTP submit) is returned (refer to reference character "a12" in FIG. 6), the reception box 1 performs quarantine determination (refer to reference character "a13" in FIG. 6).

If the quarantine processing result is negative, the reception box 1 notifies a quarantine instruction screen to the communication device 2 (refer to reference character "a14" in FIG. 6), and arranges the communication device 2 to perform quarantine. In addition, if the quarantine processing result is positive, the reception box 1 performs processing for public key exchange between the communication device 2 (refer to reference characters "a16" to "a18" in FIG. 6). The reception box 1 registers the public key (communication device 2) to the key information retaining section 133 of the storage device 13 (refer to reference character "a18" in FIG. 6).

Similarly, the communication device 2 registers a public key (reception box 1) from the reception box 1 to the key information retaining section 234 of the storage device 23. In this case, for the public key (reception box 1) from the reception box 1, a public key of each device (for instance, the camera 3 or the home gateway 4) connected to the main network 101 is handed over to the communication device 2 by the reception box 1 on behalf of each device.

Subsequently, the reception box 1 performs VLAN switchover (refer to reference character "a19" in FIG. 7), and notifies a network switchover instruction screen to the communication device 2 (refer to reference character "a20" in FIG. 7). Upon receiving notification, the communication device 2 performs processing for address setting using an RS (Router Solicitation) message or an RA (Router Advertisement) (refer to reference character "a 21" in FIG. 7).

When the communication device 2 either detects a linkDown (mobile detection) of the check-in network 102 (refer to reference character "a 22" in FIG. 7), or, in the event that the communication device 2 is found to support connection requirements through the connection requirement check, when VLAN switchover is performed (refer to reference character "a 23" in FIG. 7) and a linkUp to the main network 101 (plug-in to the main network) is detected (refer to reference character "a 24" in FIG. 7), confirmation of plug-in destination is performed using the check-in tool 233 (refer to reference character "a 25" in FIG. 7).

The communication device 2 transmits a query request for confirming plug-in destination to the main network 101 via broadcast (refer to reference character "a26" in FIG. 7). In this case, since the camera 3, home gateway 4 and a directory server (DA: Directory Agent), not shown, are connected to the main network 101, replies from these devices are returned to the communication device 2 (refer to reference character "a27" in FIG. 7).

Information on devices connected to the main network 101 is registered to the directory server. Therefore, the communication device 2 commences home link detection and home link processing (refer to reference character "a28" in FIG. 7). When doing so, the communication device 2 will be able to verify whether the information is from the camera 3, home gateway 4 and the directory server using the public keys registered in the key information retaining section 234.

A detailed description of the above-mentioned quarantine processing will now be provided with reference to FIGS. 8 and 9. At the communication device 2, when a cable is connected (plug-in) to port "d" of the hub 5 (refer to reference character "b1" in FIG. 8), and connection is made to the check-in network 102, the communication device 2 detects linkUp to the check-in network 102 (refer to reference character "b2" in FIG. 8), and uses the check-in tool 233 to perform plug-in destination confirmation (refer to reference character "b3" in FIG. 8).

The communication device 2 transmits a query request for confirming plug-in destination to the check-in network 102 via broadcast (refer to reference character "b4" in FIG. 8). In this case, since the communication device 2 is quarantine-connected on a one-on-one basis only to the reception box 1 via the check-in network 102, the reception box 1 will return a reply to the communication device 2 (refer to reference character "b5" in FIG. 8). Upon return of the reply, the communication device 2 performs the above-mentioned service search processing (refer to reference character "b6" in FIG. 8).

The communication device 2 prepares a global address (refer to reference character "b7" in FIG. 8), and subsequently performs an HTTP access to the reception box 1 (refer to reference character "b8" in FIG. 8). The reception box 1 performs a connection requirement check in regards to the HTTP access from the communication device 2 (refer to reference character "b9" in FIG. 8). Since the check performed on the connection requirements is similar to the processing described for the above-described embodiment of the present invention, a description thereof will be omitted.

If the reception box 1 finds through the connection requirement check that the connection requirements are not supported, the reception box 1 notifies a quarantine screen to the communication device 2 (refer to reference character "b10" in FIG. 8). When the quarantine screen is clicked, the communication device 2 returns an HTTP Submit to the reception box 1 (refer to reference character "b11" in FIG. 8). When the HTTP Submit is returned from the communication device 2, the reception box 1 commences quarantine of the communication device 2 (refer to reference character "b12" in FIG. 8), and sends a quarantine commencement script to the communication device 2 (refer to reference character "b13" in FIG. 8).

The communication device 2 thereby executes the quarantine commencement script, and returns an HTTP Submit to the reception box 1 (refer to reference character "b14" in FIG. 8). When the HTTP Submit is returned from the communication device 2, the reception box 1 arranges auxiliary files (public key of the home gateway 4 [host key], quarantine data, quarantine script) to be downloaded by the communication device 2 (refer to reference character "b15" in FIG. 8).

Once auxiliary files are downloaded, the communication device 2 executes the quarantine script, gathers information, and creates and displays a form (refer to reference character "b16" in FIG. 8). When a given icon or the like (not shown) is clicked within the display, the communication device 2 returns an HTTP submit (status information of the communication device, public key) to the reception box 1 (refer to reference character "b17" in FIG. 8). The reception box 1 performs quarantine determination based on information from the communication device 2 (refer to reference character "b18" in FIG. 9), and if the result is negative, notifies a correction instruction screen to the communication device 2 (refer to reference character "b19" in FIG. 9).

Upon receiving the correction instruction screen, the communication device 2 performs correction of its own status (for instance, downloading and applying latest patches, downloading and applying latest patterns and patches of antivirus software, neutralizing infectious viruses and spyware or the like) based on the instructions. Once correction is completed, the communication device 2 transmits end of correction, together with its own public key, to the reception box 1 (refer to reference character "b20" in FIG. 9). The above-described downloading to the communication device 2 is performed via the reception box 1, and access is only permitted to respective dedicated websites. Access from the communication device 2 to other sites is disabled.

The reception box 1 retains the public key in the key information retaining section 133 of the storage device 13 (refer to reference character "b21" in FIG. 9). Once the public key is registered, or when connection requirements have been satisfied, the reception box 1 notifies a network switchover instruction screen to the communication device 2 (refer to reference character "b22" in FIG. 9).

Next, processing of the check-in tool used in the above-described processing will be described with reference to FIG. 10. In the above-described processing, when connection to the check-in network 102 is detected by inserting a cable to port "d" of the network device (hub 5), the check-in tool 233 is activated. At this point, the activation of the check-in tool 233 causes the communication device 2 to perform link state confirmation (step S11 in FIG. 10) and network confirmation (step S12 in FIG. 10), and acquisition of qualification screening information from within the device itself (step S13 in FIG. 10).

The communication device 2 transmits acquired qualification screening information to the reception box 1 (step S14 in FIG. 10), and terminates processing when a positive result of qualification screening is returned from the reception box 1 (step S15 in FIG. 10). In addition, if a positive result of qualification screening is not returned (step S15 in FIG. 10), the communication device 2 performs confirmation of correction status, or in other words, correction instructed by the reception box 1, and confirms its subsequent correction status (step S16 in FIG. 10). If correction has already been made, the communication device 2 returns to step S13 to acquire qualification screening information of the device itself.

Processing for confirmation of the plug-in destination network will now be described with reference to FIG. 11. The communication device 2 activates processing for confirmation of the plug-in destination network upon linkUp to the main network 101 (step S21 in FIG. 11). When confirmation processing is activated, the communication device 2 performs an inquiry (service type: x-network-id, service URL: type+ID) to the main network 101 via SLP (multicast), and acquires a network ID (step S22 in FIG. 11).

When the communication device 2 determines that the type is a check-in network 102 (step S23 in FIG. 11), check-in processing (quarantine+key exchange) is performed by the communication device 2 (step S24 in FIG. 11). In addition, when the communication device 2 determines that the type is a home link 100 (step S25 in FIG. 11), the communication device 2 performs home link processing (step S26 in FIG. 11). Furthermore, when the communication device 2 determines that the type is a foreign link, not shown (step S27 in FIG. 11) the communication device 2 performs foreign link processing (step S28 in FIG. 11). A description on foreign link processing will be provided later.

Figure 12:
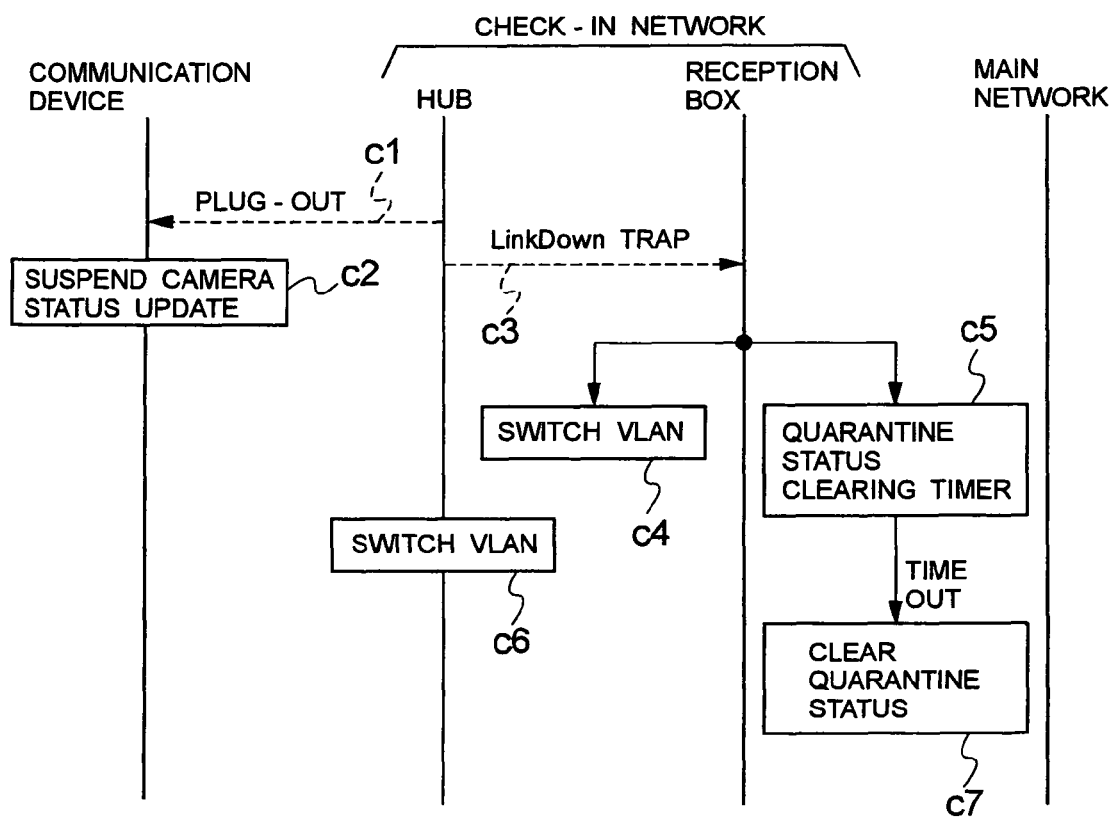
FIG. 12 is a sequence chart showing operations during plug-out in the communication system according to the first example of the present invention.

FIG. 12 is a sequence chart showing operations during plug-out in the communication system according to the first example of the present invention. Operations during plug-out of the communication system according to the first example of the present invention will now be described with reference to FIG. 12. In FIG. 12, the processing of the reception box 1 is realized by the CPU 11 by executing the control program 12a, while the processing of the communication device 2 is realized by the CPU 21 by executing the control program 22a.

In the event that the communication device 2 is disconnected (plug-out) from the main network when its cable is detached from port "d" of the hub 5 (refer to reference character "c1" in FIG. 12), status update of the camera 3 is suspended (refer to reference character "c2" in FIG. 12). At this point, since a linkDown trap indicating that the cable has been detached from the hub 5 is inputted to the reception box 1 (refer to reference character "c3" in FIG. 12), the reception box 1 performs a switchover (VLAN switchover) from the main network 101 to the check-in network 102 (refer to reference character "c4" in FIG. 12), and activates a quarantine status clearing timer, not shown (refer to reference character "c5" in FIG. 12).

Switchover from the main network 101 to the check-in network 102 (VLAN switchover) is thereby performed (refer to reference character "c6" in FIG. 12). In addition, when the quarantine status clearing timer times out, a quarantine status of the communication device 2 retained at the reception box 1 is cleared (refer to reference character "c7" in FIG. 12).

While the present example assumes that the check-in tool 233 for performing the above-described processing has been installed (Bootstrap: tool installer) in the communication device 2, the communication device 2 may instead be arranged to connect to a download site (not shown) for the check-in tool to download and install the same upon new connection of the communication device 2.

When downloading the check-in tool, the communication device 2 must at least be installed with a Web browser. When a cable of the communication device 2 is connected to the hub 5 and the Web browser accesses an arbitrary website, the reception box 1 performs redirection to guide the access to the download site for the check-in tool, and arranges the check-in tool to be downloaded from the download site onto the communication device 2. As a result, according to the present example, new introduction of various tools (software) may be arranged to be performed in a simple and compulsory manner, thereby enabling resolution of the prerequisite problem in that various tools must be installed when service is provided.

As seen, according to the present example, for connection monitoring (L2 [Layer2] state monitoring) to the hub 5, which is a series of processing in a sequence of: L2 to L3 (Layer 3), and L3 to application, since a status change of L2 is used as a trigger for operation, processing may be concluded by merely plugging the cable of the communication device 2 to ports "c" to "h" of the hub 5, which is a simple operation that anybody can perform.

In this case, in addition to detection of status changes (linkUp/linkDown) of links, the communication device 2-side may perform auto-detection of status changes/switchovers of the VLAN using the same port. The hub 5 performs switching of the VLAN according to status changes (linkUp/linkDown) of a link.

At the communication device 2-side, (1) connection is always established to the check-in network 102 immediately after plug-in. If requirements are not satisfied (for instance, not yet quarantined), the messages "Quarantine" and "Register" are notified. If requirements are satisfied (for instance, already quarantined), a VLAN switchover to the main network 101 is performed to enable use of the same and allow information to be provided therefrom.

In addition, at the communication device 2-side, (2) when the cable is unplugged from the hub 5, the relevant port is connected to the check-in network 102 through auto-detection. Furthermore, at the communication device 2-side, (3) when a problem occurs (for instance, when a worm is found), all ports of the hub 5 are connected to the check-in network 102.

Therefore, according to the present example, demonstration and the like of execution of IPv6 (Internet Protocol version 6) rapid service discovery up to execution of applications may now be performed by simply plugging the cable of the communication device 2 into a port of the hub 5. According to the present example, this opens the way for development of a system for constructing a communication environment in which operations are guided and devices are configured unerringly in one simple operation. Therefore, even initialization of devices is automatically performed without requiring the user to contemplate what to do and when, and acquired information may be verifiable as to whether such information is trustworthy.

In doing so, according to the present example, since virus-infected devices or unauthorized devices remain quarantine-connected to the reception box 101 via the check-in network 102, it is now possible to automatically perform quarantine on such devices in a compulsory manner via the reception box 1 without having such devices connect to the main network 101.

In this case, since virus-infected devices or unauthorized devices will remain quarantine-connected to the reception box 101 via the check-in network 102, it is possible to avoid spreading of viruses or increasing traffic by such devices regarding other devices simultaneously connected to the hub 5.

SECOND EXAMPLE

Figure 13:
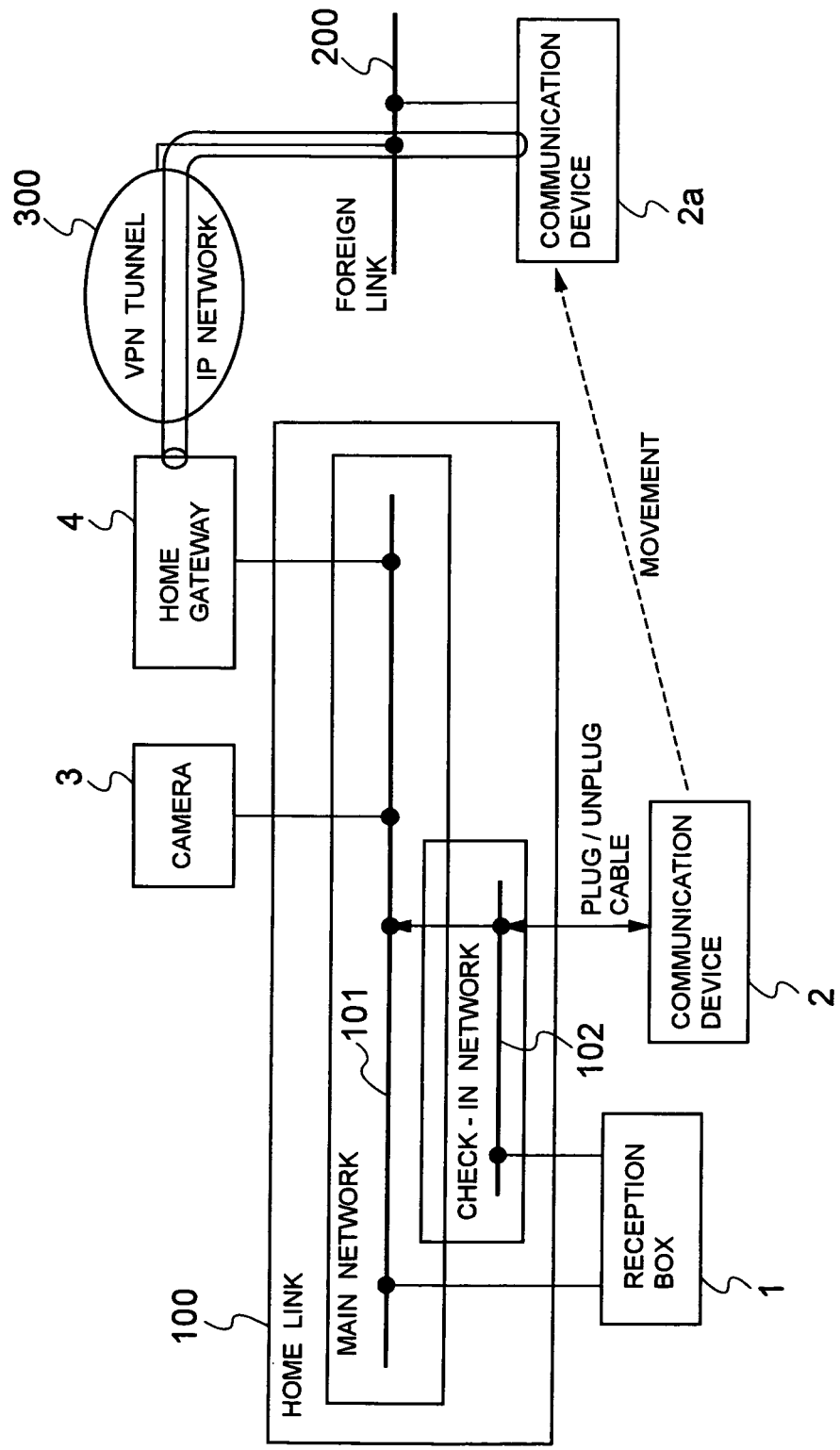
FIG. 13 is a block diagram showing a configuration of a communication system according to a second example of the present invention.

FIG. 13 is a block diagram showing a configuration of a communication system according to a second example of the present invention. FIG. 13 shows an example in which the communication device 2 moves (the communication device at the destination is deemed "2a"), and connects to the main network 100 by establishing a VPN (Virtual Private Network) tunnel between the home gateway 4 via a foreign link 200 and an IP (Internet Protocol) network 300.

In this case, it is assumed that the communication device 2a quarantine-connects on a one-on-one basis to the reception box 1 via the check-in network 102 during check-in processing performed by the reception box 1, and that a public key of the home gateway 4 has been acquired during exchange of key information. It is further assumed that the home gateway 4 has also acquired a public key of the communication device 2a via the reception box 1. Key information for establishing the VPN tunnel may be acquired using these public keys.

Figure 14:
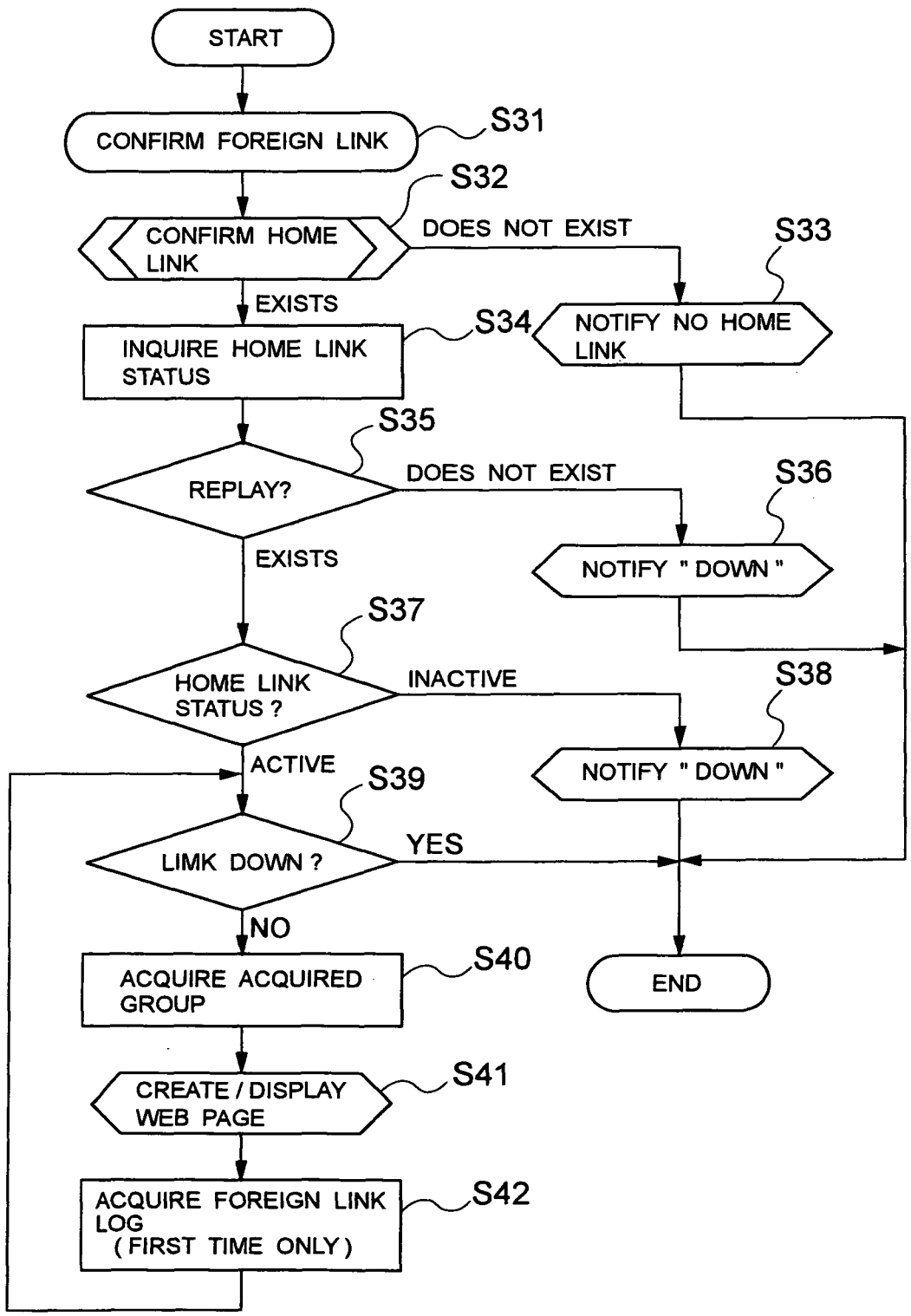
FIG. 14 is a flowchart showing operations of a communication device in the communication system according to the second example of the present invention.

FIG. 14 is a flowchart showing operations of the communication device 2a in the communication system according to the second example of the present invention. Operations of the communication device 2a will now be described with reference to FIGS. 13 and 14. The configuration of the communication device 2a is similar to that of the communication device 2 according to the first example of the present invention, shown in FIG. 4. The processing shown in FIG. 14 may be realized by the CPU 21 of the communication device 2a by executing the control program 22a.

When the communication device 2a confirms the foreign link 200 (step S31 in FIG. 14), if the home link 100 is not confirmed (step S32 in FIG. 14), the communication device 2a notifies that the home link 100 does not exist (step S33 in FIG. 14) and terminates processing.

If the communication device 2a confirms the home link 100 (step S32 in FIG. 14), the communication device 2a inquires the status of the home link 100 (step S34 in FIG. 14). When there is no reply (step S35 in FIG. 14), the communication device 2a notifies "down" (step S36 in FIG. 14) and terminates processing.

If there is a reply (step S35 in FIG. 14), the communication device 2a checks the status of the home link 100 (step S37 in FIG. 14). If the status of the home link 100 is inactive, the communication device 2a notifies "down" (step S38 in FIG. 14) and terminates processing.

If the status of the home link 100 is active, the communication device 2a determines whether a linkDown has been generated (step S39 in FIG. 14). If so, the communication device 2a terminates processing.

If a linkDown has not been generated, the communication device 2a acquires an "Acquired Group" (step S40 in FIG. 14), performs generation/display of a web page (step S41 in FIG. 14), and for the first time only, acquires a log of the foreign link 200 (step S42 in FIG. 14). The above processing will be repeated until linkDown is generated (steps S39 to S41 in FIG. 14).

The log of the foreign link 200 is information (such as IP address, netmask, default router, routing table, neighbor cache table and arp table) necessary for connecting to the foreign link 200 next time and thereafter.

As seen, according to the present example, when check-in processing is performed by the above-described reception box 1 on the communication device 2a, since a VPN tunnel between the home gateway 4 connected to the main network 101 may be established using key information acquired by the communication device 2a upon connecting from an external network (foreign link 200), the communication device 2a will be able to connect to the main network 101 from the outside in a safe and simple manner.

According to the present example, a wide variety of service information (camera information, VPN [Virtual Private Network] information, net status information, key and the like) may be targeted. In addition, keys requiring confidentiality may be exchanged in a simple and safe manner via the reception box 1.

THIRD EXAMPLE

Figure 15:
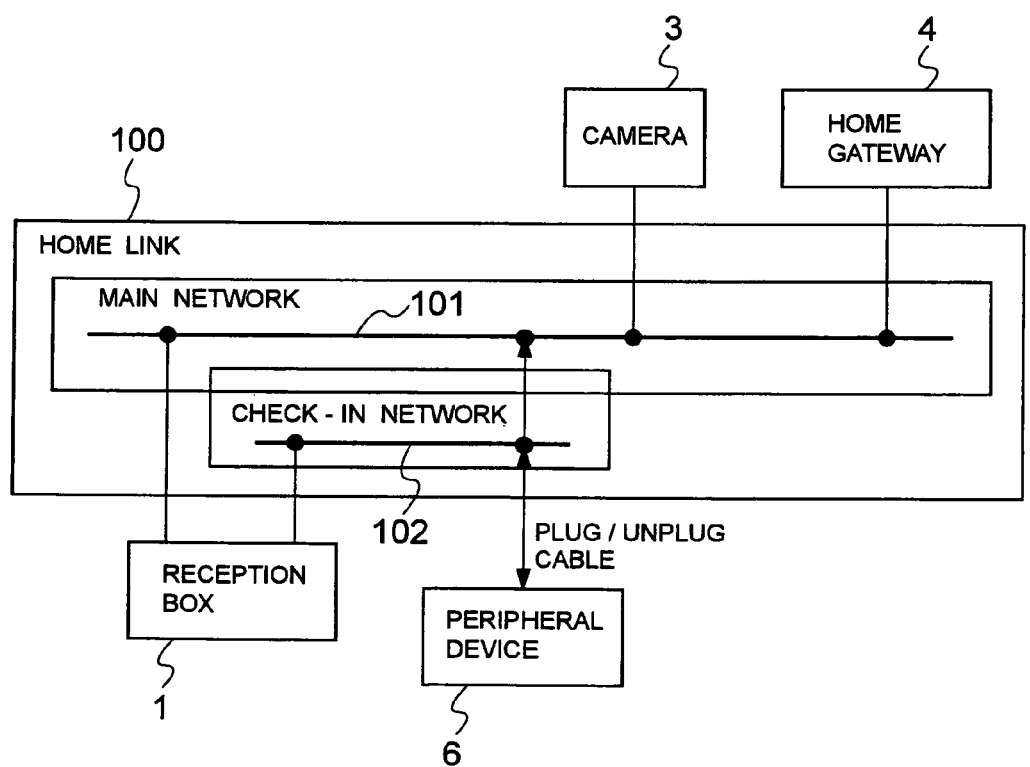
FIG. 15 is a block diagram showing a configuration of a communication system according to a third example of the present invention.

FIG. 15 is a block diagram showing a configuration of a communication system according to a third example of the present invention. FIG. 15 shows an example in which a peripheral device 6 (for instance, a wireless LAN [Local Area Network] AP [Access Point] or router, an information appliance and the like) incapable of autonomous service search (does not allow loading of a check-in tool) is connected to the main network 101.

Figure 16:
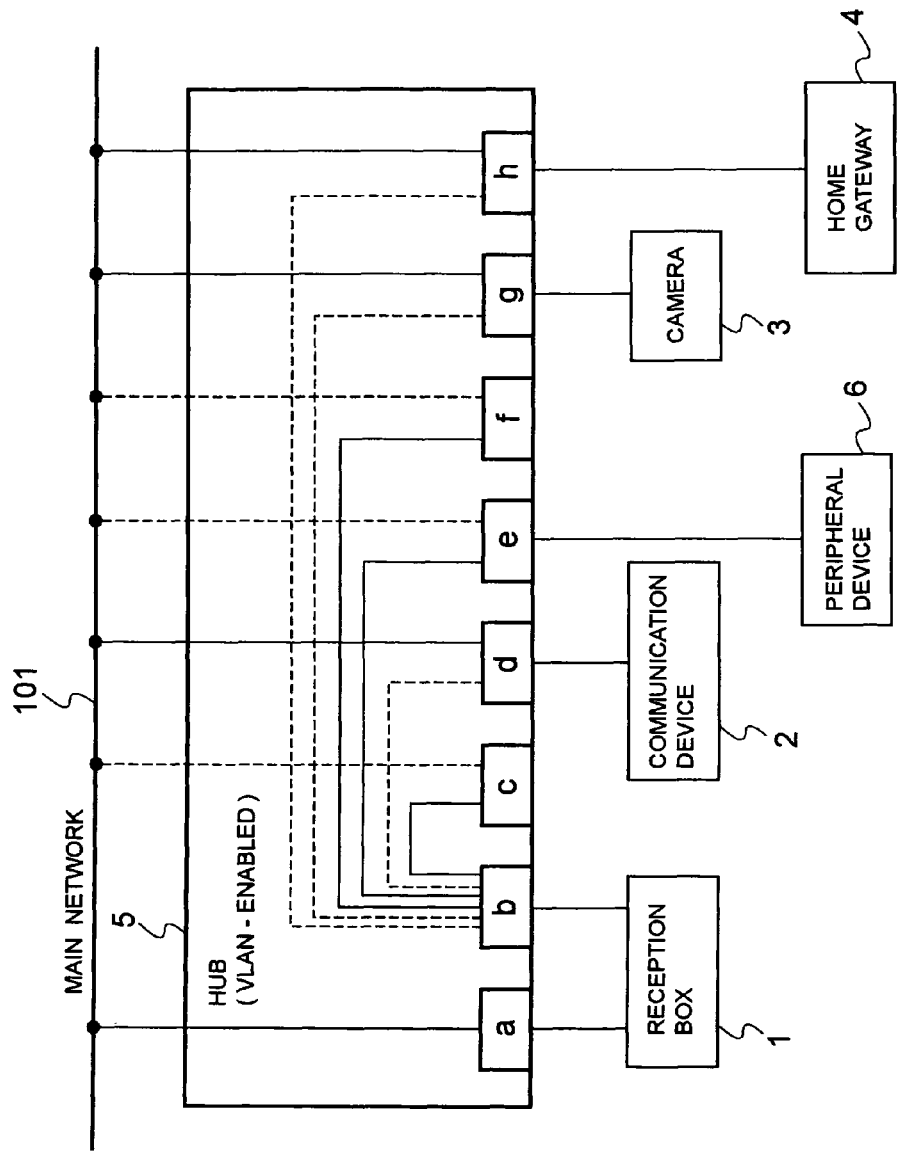
FIG. 16 is a block diagram showing a connection status of a reception box and peripheral device in a communication system according to the third example of the present invention.

FIG. 16 is a block diagram showing a connection status of the reception box 1 and the peripheral device 6 in the communication system according to the third example of the present invention. As shown in FIG. 16, a hub (VLAN-enabled) is provided with ports "a" to "h". The reception box 1 is connected to the main network 101 via port "a" and to the check-in network 102 via port "b". The present example is applicable to network devices other than hubs (such as routers and the like). In addition, the network device operates under a protocol such as SNMP (Simple Network Management Protocol).

Ports "c" to "h" are arranged to switchover devices connected thereto between connection to the main network 101 and one-on-one connection to port "b" via the check-in network 102. As a result, one-on-one quarantine connection may be established between the reception box 1 connected to port "b" and a communication device connected to any of the ports "c" to "h". In this case, the hub 5 is incapable of mutually connecting communication devices respectively connected to ports "c" to "h".

FIG. 16 shows a state in which the peripheral device 6 connected to port "e" is quarantine-connected on a one-on-one basis to the reception box 1 connected to port "b". Since connection requirement checks (qualification screening) of the communication device 2, the port camera 3 and the home gateway 4, respectively connected to ports "d", "g" and "h", have already been concluded by the reception box 1, the communication device 2, the port camera 3 and the home gateway 4 are connected to the main network 101.

When the peripheral device 6 is quarantine-connected on a one-on-one basis by the check-in network 102 to the reception box 1, the reception box 1 determines the type of the connected device based on signals from the peripheral device 6, and configures the peripheral device 6 according to the determination results. Subsequently, at the port "e", to which the peripheral device 6 is connected, the reception box 1 connects the network, to which the peripheral device 6 is connected, to the main network 101.

Figure 17:
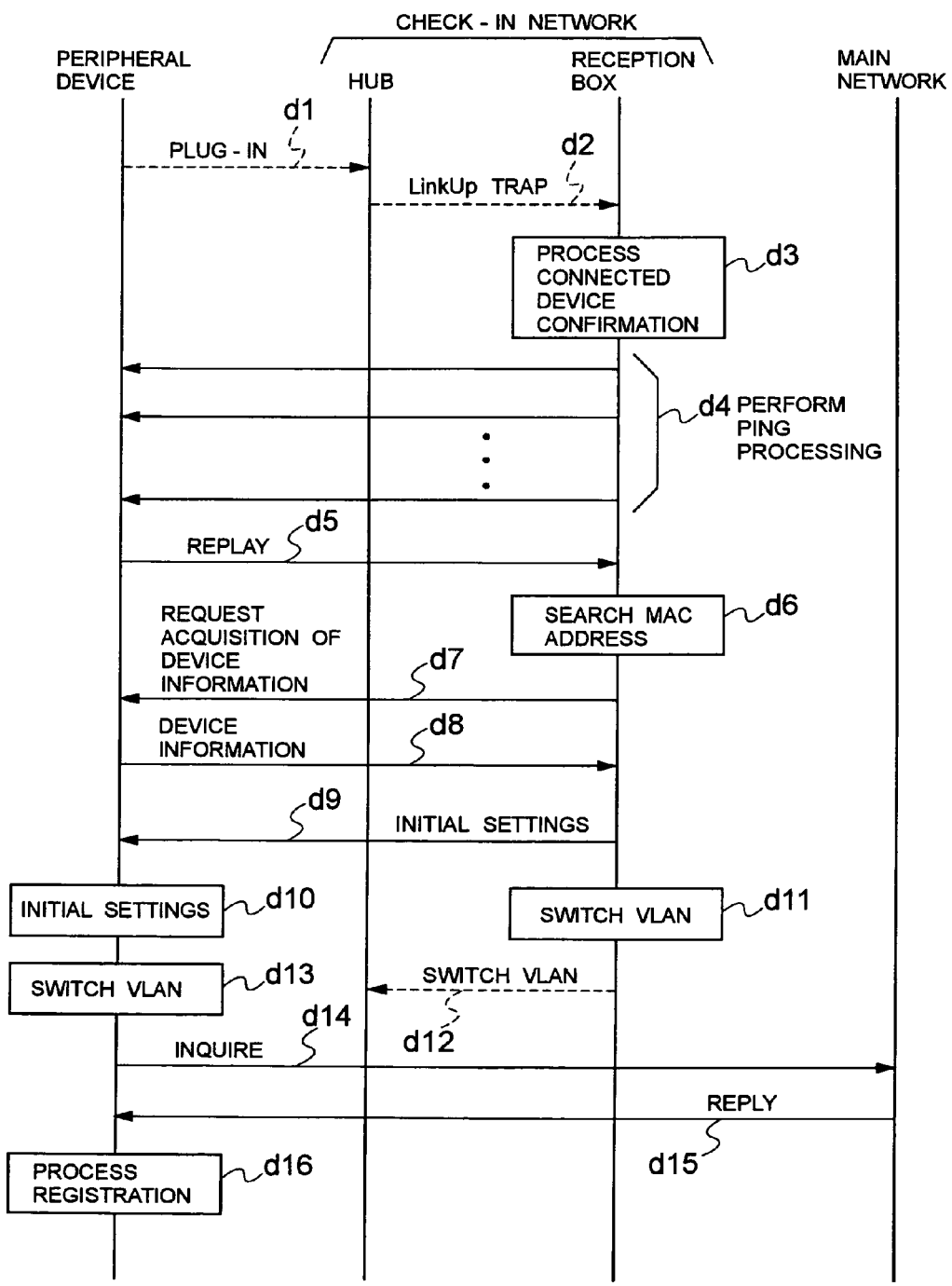
FIG. 17 is a sequence chart showing network connection processing in the communication system according to the third example of the present invention.

FIG. 17 is a sequence chart showing network connection processing in the communication system according to the third example of the present invention. Operations of the communication system according to the third example of the present invention will now be described with reference to FIGS. 15 to 17. In FIG. 17, the processing of the reception box 1 is realized by the CPU 11 by executing the control program 12a, while the processing of the peripheral device 6 is realized by a CPU, not shown, by executing a control program.

When a cable of the peripheral device 6 is connected to port "e" of the hub 5 and connection is made to the check-in network 102 (plug-in to the check-in network; refer to reference character "d1" in FIG. 17), the hub 5 notifies the reception box 1 that the peripheral device 6 has been connected to the check-in network 102 via a link Up trap (refer to reference character "d2" in FIG. 17).

When notified that the peripheral device 6 has been connected to the check-in network 102, the reception box 1 commences confirmation processing of the connected device while referencing the database 15 (refer to reference character "d3" in FIG. 17), and transmits a ping signal (a signal for confirming connectivity) corresponding to each connected device to the peripheral device 6 until a reply therefrom is returned (ping processing; refer to reference character "d4" in FIG. 17).

When a reply is returned from the peripheral device 6 (refer to reference character "d5" in FIG. 17), the reception box 1 acquires a manufacturer name, type of device or the like corresponding to the reply (in other words, the reply to the ping) by referencing the database 15, and searches the database 15 to acquire a MAC (Media Access Control) address of the device (refer to reference character "d6" in FIG. 17).

The reception box 1 transmits a device information acquisition request to the peripheral device 6 based on the acquired MAC address (refer to reference character "d7" in FIG. 17). After acquiring device information from the peripheral device 6 (refer to reference character "d8" in FIG. 17), the reception box 1 determines the type of the peripheral device 6 based on the acquired device information and sends initialization information corresponding to the device type to the peripheral device 6 (refer to reference character "d9" in FIG. 17), and performs initialization of the peripheral device 6 (refer to reference character "d10" in FIG. 17). In this case, setting information for connecting to the main network 101 may be sent instead of initialization information.

Subsequently, the reception box 1 performs switchover (VLAN switchover) of the connection destination of the peripheral device 6 from the check-in network 102 to the main network 101 (refer to reference characters "d11" and "d12" in FIG. 17), and VLAN switchover is subsequently performed at the peripheral device 6 (refer to reference character "d13" in FIG. 17). The peripheral device 6 transmits a query request for confirming plug-in destination to the main network 101 via broadcast (refer to reference character "d14" in FIG. 17).

In this case, since the camera 3, home gateway 4 and a directory server (DA), not shown, are connected to the main network 101, replies from these devices are returned to the peripheral device 6 (refer to reference character "d15" in FIG. 17). At this point, since information on devices connected to the main network 101 is registered in the directory server, the peripheral device 6 commences registration processing to the directory server in the same manner as other devices (refer to reference character "d16" in FIG. 17).

As a result, according to the present example, qualification screening of the peripheral device 6 and settings for connection to the main network 101 by the reception box 1 are performed by simply plugging the cable of the peripheral device 6 into ports "c" to "h" of the hub 5. Therefore, the peripheral device 6 may be connected to the main network 101 in a simple and convenient manner.

As seen, the present example supports various types (passive/active) of IP (Internet Protocol) devices. Passive devices that do not allow autonomous service search (do not allow loading of a check-in tool) include wireless LAN (Local Area Network) APs (Access Points) as described above, while active devices that allow autonomous service search (allow loading of a check-in tool) include notebook PCs (Personal Computers) and PDAs (Personal Digital Assistants) or the like.

FOURTH EXAMPLE

Figure 18:
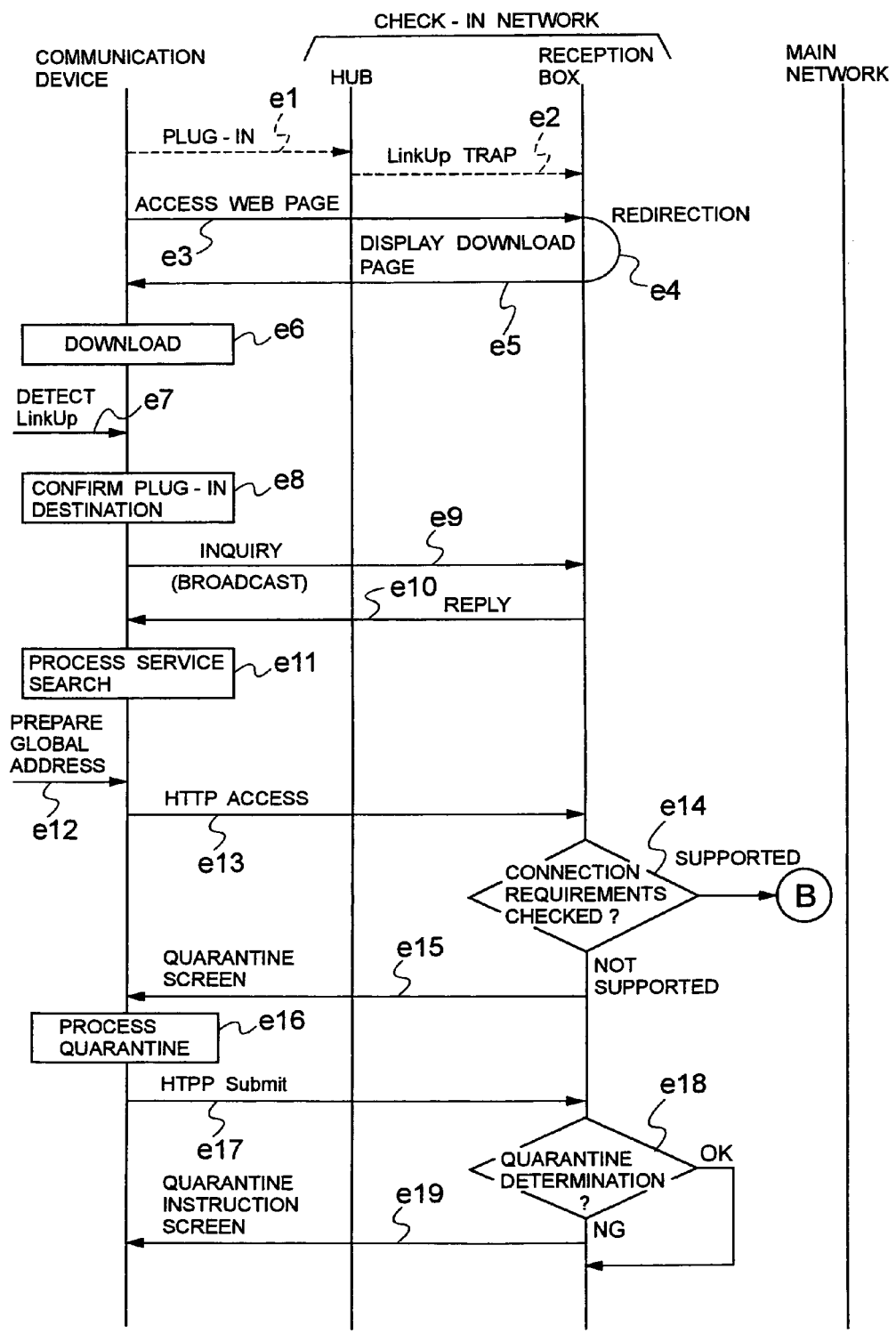
FIG. 18 is a sequence chart showing network connection processing in the communication system according to a fourth example of the present invention.
Figure 19:
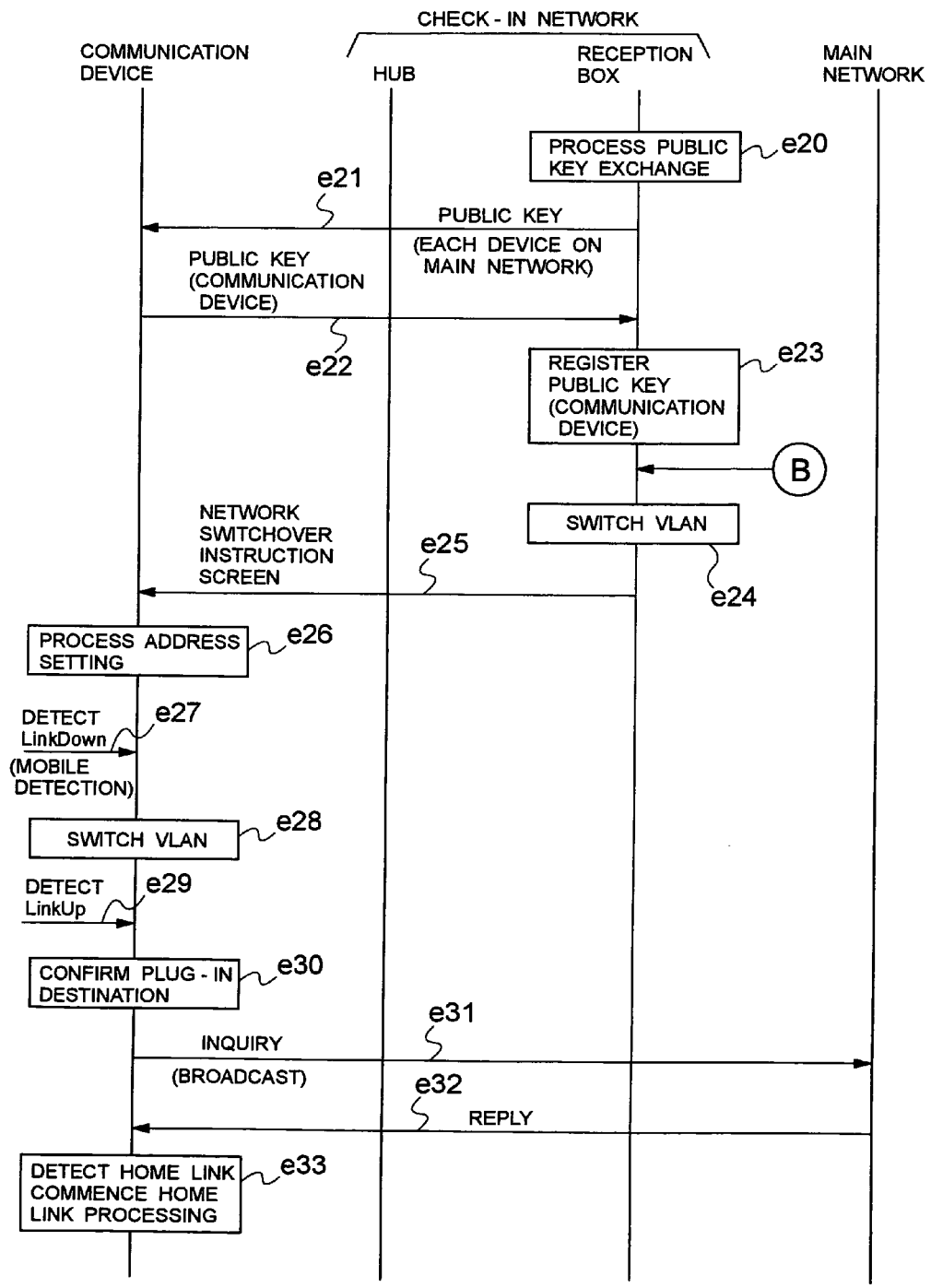
FIG. 19 is a sequence chart showing network connection processing in the communication system according to the fourth example of the present invention.

FIGS. 18 and 19 are sequence charts showing network connection processing in a communication system according to a fourth example of the present invention. The communication system and respective devices according to the fourth example of the present invention are configured in the same manner as the communication system and respective devices according to the first example of the present invention shown in FIGS. 2 to 5. Thus, operations of the communication system according to the fourth example of the present invention will now be described with reference to FIGS. 2 to 5, and FIGS. 18 and 19. It is assumed that the communication device 2 is newly connected to the main network 101, and that a check-in tool has not been installed. In addition, in FIGS. 18 and 19, the processing of the reception box 1 is realized by the CPU 11 by executing the control program 12a, while the processing of the communication device 2 is realized by the CPU 21 by executing the control program 22a.

When a cable of the communication device 2 is connected (plug-in to the check-in network) to port "f" of the hub 5 (refer to reference character "e1" in FIG. 18) and connection is made to the check-in network 102, the hub 5 notifies the reception box 1 that the communication device 2 has been connected to the check-in network 102 via a linkUp trap (refer to reference character "e2" in FIG. 18).

Upon receiving notification that the communication device 2 has been connected to the check-in network 102, and when an arbitrary website has been accessed by the communication device 2 using a Web browser (refer to reference character "e3" in FIG. 18), the reception box 1 performs redirection to guide the access to a download site for the check-in tool (refer to reference character "e4" in FIG. 18) causes the communication device 2 to download the check-in tool from the download site (refer to reference characters "e5" and "e6" in FIG. 18), and arranges the communication device 2 to install the check-in tool.

When the communication device 2 detects linkup to the check-in network 102 (refer to reference character "e7" in FIG. 18), the communication device 2 uses the installed check-in tool to confirm plug-in destination (refer to reference character "e8" in FIG. 18). The communication device 2 transmits a query request for confirming the plug-in destination to the check-in network 102 via broadcast (refer to reference character "e9" in FIG. 18). In this case, since the communication device 2 is quarantine-connected on a one-on-one basis to the reception box 1 via the check-in network 102, the reception box 1 will return a reply to the communication device 2 (refer to reference character "e10" in FIG. 18).

When a reply is returned, the communication device 2 executes service search processing using an SLP query, an SLP reply (HTTP URL) and the like (refer to reference character "e11" in FIG. 18). The communication device 2 prepares a global address (refer to reference character "e12" in FIG. 18), and subsequently performs an HTTP access to the reception box 1 (refer to reference character "e13" in FIG. 18).

The reception box 1 performs a connection requirement check in regards to the HTTP access from the communication device 2 (refer to reference character "e14" in FIG. 18). In this case, the connection requirements are one of the types of qualification requirements described above in association with the embodiment of the present invention. Since the check performed on the connection requirements is also similar to the processing described for the above-described embodiment of the present invention, a description thereof will be omitted.

If the reception box 1 finds through the connection requirement check that the connection requirements are not supported, the reception box 1 notifies a quarantine screen to the communication device 2 (refer to reference character "e15" in FIG. 18), and arranges the communication device 2 to perform quarantine processing (refer to reference character "e16" in FIG. 18). Once quarantine processing is performed at the communication device 2 and a processing result (HTTP submit) is returned (refer to reference character "e17" in FIG. 18), the reception box 1 performs quarantine determination (refer to reference character "e18" in FIG. 18).

If the quarantine processing result is negative, the reception box 1 notifies a quarantine instruction screen to the communication device 2 (refer to reference character "e19" in FIG. 18), and arranges the communication device 2 to perform quarantine. In addition, if the quarantine processing result is positive, the reception box 1 performs processing for public key exchange between the communication device 2 (refer to reference characters "e20" to "e22" in FIG. 19). The reception box 1 registers the public key (communication device 2) to the key information retaining section 133 of the storage device 13 (refer to reference character "e23" in FIG. 19).

Similarly, the communication device 2 registers a public key (reception box 1) from the reception box 1 to the key information retaining section 234 of the storage device 23. In this case, for the public key (reception box 1) from the reception box 1, a public key of each device (for instance, the camera 3 or the home gateway 4) connected to the main network 101 is handed over to the communication device 2 by the reception box 1 on behalf of each device.

Subsequently, the reception box 1 performs VLAN switchover (refer to reference character "e24" in FIG. 19), and notifies a network switchover instruction screen to the communication device 2 (refer to reference character "e25" in FIG. 19). Upon receiving notification, the communication device 2 performs processing for address setting using an RS message or an RA and the like (refer to reference character "e26" in FIG. 19).

When the communication device 2 either detects a linkDown (mobile detection) of the check-in network 102 (refer to reference character "e27" in FIG. 19), or, in the event that the communication device 2 is found to support connection requirements through the connection requirement check, when VLAN switchover is performed (refer to reference character "e28" in FIG. 19) and a linkup to the main network 101 (plug-in to the main network) is detected (refer to reference character "e29" in FIG. 19), confirmation of plug-in destination is performed using the check-in tool (refer to reference character "e30" in FIG. 19).

The communication device 2 transmits a query request for confirming plug-in destination to the main network 101 via broadcast (refer to reference character "e31" in FIG. 19). In this case, since the camera 3, home gateway 4 and a directory server (DA), not shown, are connected to the main network 101, replies from these devices are returned to the communication device 2 (refer to reference character "e32" in FIG. 19). At this point, information on devices connected to the main network 101 is registered to the directory server. Therefore, the communication device 2 commences home link detection and home link processing (refer to reference character "e33" in FIG. 19).

As described above, according to the present invention, a hybrid authentication is enabled which combines automatic quarantine wherein the reception box 1 and the communication device 2 are connected on a one-on-one basis by the check-in network 102, and human authentication capable of monitoring terminal use by suspicious individuals. Even in this case, a user is no longer required to input a password when connecting to the network, and may perform network connection in a safe and simple manner. While the reception box 1 and the hub 5 are described as mutually independent devices in each example of the present invention, the same operations and advantages described above may be achieved by using a device which integrates the reception box 1 and the hub 5.

FIFTH EXAMPLE

Figure 20:
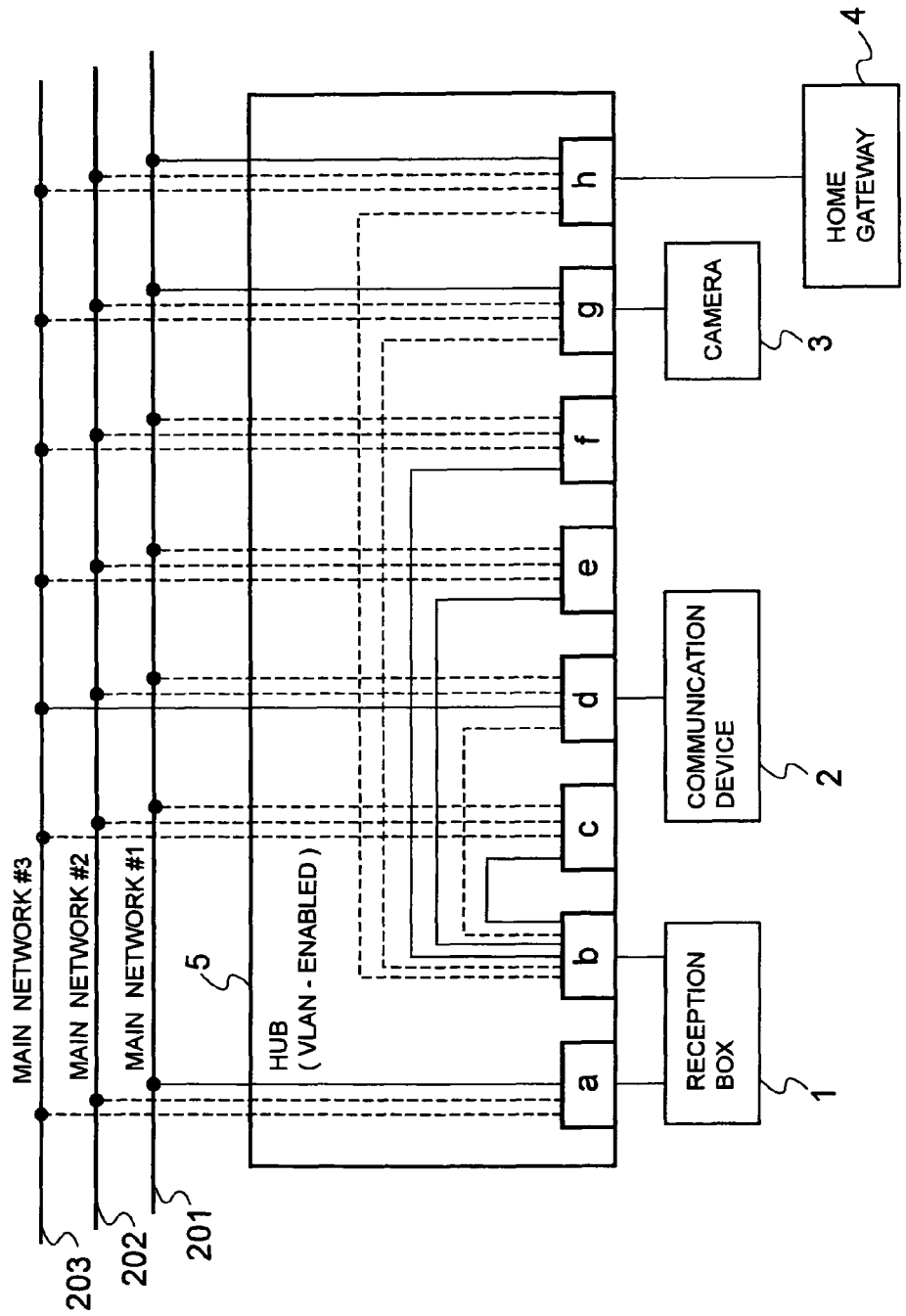
FIG. 20 is a block diagram showing a connection status of a reception box and a communication device according to a fifth example of the present invention.

FIG. 20 is a block diagram showing a connection status of a reception box and a communication device according to a fifth example of the present invention. In FIG. 20, according to the fifth example of the present invention, the communication device 2 is arranged to be connectable to any one of three main networks (#1 to #3) 201 to 203 according to its qualification requirements.

A hub (VLAN-enabled) 5 is provided with ports "a" to "h". The reception box 1 is connected to the main network (#1) 201 via port "a" and to the check-in network via port "b". The present example is applicable to network devices other than hubs (such as routers and the like). In addition, the network device operates under a protocol such as SNMP (Simple Network Management Protocol).

Furthermore, ports "c" to "h" are arranged to switchover devices connected thereto between connection to any one of three main networks (#1 to #3) 201 to 203 and one-on-one connection to port "b" via the check-in network 102. As a result, one-on-one quarantine connection may be established between the reception box 1 connected to port "b" and a communication device connected to the ports "c" to "h". In this case, the hub 5 is incapable of mutually connecting communication devices respectively connected to ports "c" to "h".

FIG. 20 shows a state in which the communication device 2 connected to port "d" is quarantine-connected on a one-on-one basis to the reception box 1 connected to port "b" to undergo qualification screening, and is then selectively connected to the main network (#3) 203 according to qualification requirements. In addition, FIG. 20 shows a state in which connection requirement checks (qualification screening) of the camera 3 and the home gateway 4, respectively connected to ports "g" and "h", have already been concluded by the reception box 1, and the camera 3 and the home gateway 4 are selectively connected to the main network (#1) 201.

As seen, according to the present example, even in the event that a plurality of main networks exist (the present example is capable of supporting four or more main networks), the same processing as performed in the above-described first to fourth examples of the present invention may be performed. Thus, a similar advantage may be gained, and a main network to connect to may be selected according to preset qualification requirements.

While a quarantine system is primarily described in the above-described first to fifth examples of the present invention, the present invention may alternatively be applied to systems which set and use the following qualification screening criteria as requirements for connecting to a main network.
(1) Whether quarantine measures have been implemented
(2) Whether informative matters have been confirmed
(3) Whether unprocessed issues for each user have been notified A system in which the requirement (1) above has been set may conceivably perform quarantine of a communication device to be connected (for instance, whether the device is infected by viruses, whether latest patches have been applied to the OS and the like, or whether the latest virus definition file is available and the like) as a qualification screening criteria, and permit connection to the main network after passing the quarantine. In this system, merely configuring the above-mentioned check-in tool to enable confirmation of such requirements will suffice. Configuration and operations of the system may be similar to the configuration and operations of the first to fifth examples of the present invention described above.

In a system in which the requirement (2) above has been set, connection requirements may conceivably be set as qualification screening criteria so that connecting parties are not identified, while reading a particular web page shared by connection destination organizations may be arranged to be compulsory in order to convey informative matters in an ensured manner or to obtain agreement through operations performed when reading the particular web page.

The system may conceivably be arranged so that the check-in network require that: a user of a communication device to be connected invariably read a particular web page which posts notices or advisories that must be read by everyone in the connection destination organization; the check-in network guides the user to the particular website when connecting to the check-in network; and connection to the main network is permitted after reading the web page. Configuration and operations of this system may also be similar to the configuration and operations of the first to fifth examples of the present invention described above.

A system in which the requirement (3) above has been set may conceivably involve, as qualification screening criteria: identifying the connecting party using ID information (identification information) exchanged upon check-in processing; preparing a web page to be respectively read by users; guiding a user to the website so that the contents thereof are read; and either allow the user to participate in training or educational programs using a network that is Web-based or otherwise, or remind/force unprocessed clerical procedures to be performed such as adjustment or approval of expenses accrued on a business trip and the like.

In addition, another system in which the requirement (3) above has been configured may conceivably involve, as qualification screening criteria: identifying a user of a connecting communication device using ID information (identification information) exchanged upon check-in processing; searching a database provided in the reception box using the ID information to create either a web page according to the user or a web page that displays matters which should be processed by the user; and guiding the user to the web page to either reminding or urging the user to perform displayed matters. In this case, it is conceivable that connection to the main network will be permitted when execution of the above-mentioned matters to be processed is confirmed upon connection of the user's communication device to the check-in network. Configuration and operations of these systems may also be similar to the configuration and operations of the first to fifth examples of the present invention described above.

Each system described above represents exemplary applications of the present invention. However, the present invention may be applied to any system necessitating qualification screening, and is not limited to the above-described examples and systems.

What is claimed is:

1. A communication system, comprising:
a main network that provides various services,
a check-in-network for qualification screening/setting provided independently from the main network,
a reception control section connected to the main network and the check-in-network,
a plurality of ports including at least ports a through h,
a communication device, and each port c-h is configured to connect the communication device to the main network and to port b via the check-in-network on a one-on-one basis, the reception control section being connected to the main network via port a, and the reception control section controls switching of the connect of the communication device to the main network from port b,
a hub that is incapable of mutually connecting communication devices respectively connected to ports c to h, and
a device comprising at least one processor and memory storing a computer program, the at least one processor executing instructions of the program to perform:
quarantine connection of the communication device on a one-on-one basis to the reception control section via the check-in-network when the communication device requests connection to the main network;
qualification screening, provided at the reception control section, that acquires status information of the quarantine-connected communication device on a one-on-one basis to determine whether the status satisfies preset qualification requirements; and
connecting the check-in-network, that the communication device is connected to, to the main network upon determination that the qualification requirements are satisfied,
wherein the qualification screening/setting is executed in a VLAN or a VPN at a layer lower than a network layer of an Open System Interconnect model upon status change of a link.

2. A communication system, comprising:
a plurality of main networks that provide various services,
a check-in-network for qualification screening/setting provided independently from the plurality of main networks,
a reception control section connected to the main networks and the check-in-network,
a plurality of ports including at least ports a through h,
a communication device, and each port c-h is configured to connect the communication device to at least one main network and to port b via the check-in-network on a one-on-one basis, a reception control section being connected to the at least one main network via port a, and the reception control section controls switching of the connect of the communication device to the at least one main network from port b,
a hub that is incapable of mutually connecting communication devices respectively connected to ports c to h,
a device comprising at least one processor and memory storing a computer program, the at least one processor executing instructions of the program to perform:
quarantine connection of the communication device on a one-on-one basis to the reception control section via the check-in-network when the communication device requests connection to the main networks;
qualification screening, provided at the reception control section, that acquires status information of the quarantine-connected communication device on a one-on-one basis to determine whether the status satisfies preset qualification requirements; and
selectively connecting the check-in-network, that the communication device is connected to, to any one of the plurality of main networks according to the qualification requirements upon determination that the qualification requirements are satisfied,
wherein the qualification screening/setting is executed in a VLAN or a VPN at a layer lower than a network layer of an Open System Interconnect model upon status change of a link.

3. The communication system according to claim 1, wherein the reception control section provides in advance the quarantine-connected communication device with key information for verifying, using an electronic signature function, whether information to be acquired from the main network is proper information.

4. The communication system according to claim 1, wherein the communication device provides in advance the quarantine-connected reception control section with key information for verifying, using an electronic signature function, whether information to be transmitted from the device itself to the main network is proper information.

5. The communication system according to claim 1, wherein the communication device confirms connection destination in the check-in-network when connection to the check-in-network connection is detected, triggered by connection of the device itself to the check-in-network connection, and performs automatic discovery configuration of required information to the reception control section of the confirmed connection destination.

6. The communication system according to claim 1, wherein the reception control section returns the communication device to a quarantine-connection setting when the communication device is disconnected from the main network.

7. The communication system according to claim 1, wherein, when the communication device connects to the check-in-network without being loaded with a tool for qualification screening, the reception control section guides Web access from the communication device to a download site of the tool for qualification screening, and
the communication device downloads and installs the tool for qualification screening from the download site.

8. The communication system according to claim 7, wherein, in the event that a new tool for qualification screening exists on the download site when connecting to the check-in-network, the communication device downloads and executes the new tool for qualification screening.

9. The communication system according to claim 7, wherein the tool for qualification screening confirms existence of updated information on the download site when the communication device connects to the check-in-network, and downloads the updated information if such information exists.

10. The communication system according to claim 1, wherein the reception control section connects all communication devices to the check-in-network when events regarding the main network match requirements set in advance from the outside.

11. The communication system according to claim 7, wherein the communication device is a communication device loaded with the tool for qualification screening.

12. The communication system according to claim 1, wherein the reception control section further comprises:
confirming the type of communication device when such device is incapable of being loaded with the tool for qualification screening, and setting information at the communication device according to confirmation results.

13. The communication system according to claim 12, wherein the information to be set at the communication device is information for enabling the communication device to operate on the main network.

14. The communication system according to claim 1, wherein the main network and the network for qualification screening/setting are respectively at least either the VLAN (Virtual LAN [Local Area Network]) or the VPN (Virtual Private Network).

15. A check-in-network for qualification screening/setting, provided independently from a main network that provides various services and connected to a reception control section together with the main network, the check-in-network comprising:
a plurality of ports including at least ports a through h,
a communication device, and each port c-h is configured to connect the communication device to the main network and to port b via the check-in-network on a one-on-one basis, the reception control section being connected to the main network via port a, and the reception control section controls switching of the connect of the communication device to the main network from port b,
a hub that is incapable of mutually connecting communication devices respectively connected to ports c to h, and
a device comprising at least one processor and memory storing a computer program, the at least one processor executing instructions of the computer program to perform:
performing quarantine connection of the communication device on a one-on-one basis to the reception control section when the communication device requests connection to the main network; and
connecting the communication device, quarantine-connected to the reception control section, to the main network upon determination that the status information of the communication device on a one-on-one basis satisfies preset qualification requirements,
wherein the qualification screening/setting is executed in a VLAN or a VPN at a layer lower than a network layer of an Open System Interconnect model upon status change of a link.

16. A check-in-network for qualification screening/setting, provided independently from a plurality of main networks that provide various services and connected to a reception control section together with the main networks, the check-in-network comprising:
a plurality of ports including at least ports a through h,
a communication device, and each port c-h is configured to connect the communication device to at least one main network and to port b via the check-in-network on a one-on-one basis, the reception control section being connected to the at least one main network via port a, and the reception control section controls switching of the connect of the communication device to the at least one main network from port b,
a hub that is incapable of mutually connecting communication devices respectively connected to ports c to h, and
a device comprising at least one processor and memory storing a computer program, the at least one processor executing instructions of the computer program to perform:
quarantine connection of the communication device on a one-on-one basis to the reception control section when the communication device requests connection to the main networks; and
selectively connecting the communication device, quarantine-connected to the reception control section, to one of the plurality of main networks according to the qualification requirements upon being determined that the status information of the communication device on a one-on-one basis satisfies preset qualification requirements,
wherein the qualification screening/setting is executed in a VLAN or a VPN at a layer lower than a network layer of an Open System Interconnect model upon status change of a link.

17. The check-in-network according to claim 15, wherein the reception control section provides in advance a quarantine-connected communication device with key information for verifying, using an electronic signature function, whether information to be acquired from the main network is proper information.

18. The check-in-network according to claim 15, wherein the communication device provides in advance the quarantine-connected reception control section with key information for verifying, using an electronic signature function, whether information to be transmitted from the communication device to the main network is proper information.

19. The check-in-network according to claim 15, wherein the reception control section returns the communication device to a quarantine-connection setting when the communication device is disconnected from the main network.

20. The check-in-network according to claim 15, wherein, when the communication device is quarantine-connected to the check-in-network without being loaded with a tool for qualification screening, the reception control section guides Web access from the communication device to a download site of the tool for qualification screening, and
the communication device downloads and installs the tool for qualification screening from the download site.

21. The check-in-network according to claim 20, wherein, in the event that a new tool for qualification screening exists on the download site when the communication device is quarantine-connected to the reception control section, the communication device downloads and executes the new tool for qualification screening.

22. The check-in-network according to claim 20, wherein the tool for qualification screening causes the communication device to confirm existence of updated information on the download site when connecting to the network itself, and causes the communication device to download the updated information if such information exists.

23. The check-in-network according to claim 15, wherein the reception control section causes all communication devices to connect to the network itself when events regarding the main network match requirements set in advance from the outside.

24. The check-in-network according to claim 20, wherein the communication device is a communication device loaded with the tool.

25. The check-in-network according to claim 15, wherein the reception control section confirms the type of communication device when such device is incapable of being loaded with the tool for qualification screening, and sets information at the communication device according to confirmation results.

26. The check-in-network according to claim 25, wherein the information to be set at the communication device is information for enabling the communication device to operate on the main network.

27. The check-in-network according to claim 15, wherein the main network is at least either the VLAN (Virtual LAN [Local Area Network]) or the VPN (Virtual Private Network).

28. The check-in-network according to claim 27, wherein the network itself is at least either the VLAN (Virtual LAN [Local Area Network]) or the VPN (Virtual Private Network).

29. A communication device that requests connection to a main network in a communication system comprising the main network that provides various services, a check-in-network provided independently from the main network, a reception control section connected to the main network and the network for qualification screening/setting, a plurality of ports including at least ports a through h, a communication device, each port c-h being configured to connect the communication device to the main network and to port b via the check-in-network on a one-on-one basis, the reception control section being connected to the main network via port a, and the reception control section controls switching of the connect of the communication device to the main network from port b, and a hub that is incapable of mutually connecting communication devices respectively connected to ports c to h, wherein
   the device itself is quarantine-connected on a one-on-one basis via the check-in-network to the reception control section in order to perform qualification screening on whether the device itself satisfies preset qualification requirements, and upon determination that the qualification requirements are satisfied, the check-in-network that the device itself is connected is connected to the main network,
   wherein the qualification screening/setting is executed in a VLAN or a VPN at a layer lower than a network layer of an Open System Interconnect model upon status change of a link.

30. A communication device that requests connection to a plurality of main networks in a communication system comprising the main networks that provide various services, a check-in-network provided independently from the main networks, a reception control section connected to the main networks and the network for qualification screening/setting, a plurality of ports including at least ports a through h, a communication device, each port c-h being configured to connect the communication device to at least one main network and to port b via the check-in-network on a one-on-one basis, the reception control section being connected to the at least one main network via port a, and the reception control section controls switching of the connect of the communication device to the at least one main network from port b, and a hub that is incapable of mutually connecting communication devices respectively connected to ports c to h, wherein
   the device itself is quarantine-connected on a one-on-one basis via the check-in-network to the reception control section in order to perform qualification screening on whether the device itself satisfies preset qualification requirements, and upon being determined that the qualification requirements are satisfied, the check-in-network that the device itself is connected is selectively connected to one of the plurality of main networks according to the qualification requirements,
   wherein the qualification screening/setting is executed in a VLAN or a VPN at a layer lower than a network layer of an Open System Interconnect model upon status change of a link.

31. The communication device according to claim 29, wherein, in a state of quarantine-connection to the reception control section via the check-in-network, key information for verifying, using an electronic signature function, whether information to be acquired from the main network is proper information, is provided in advance from the reception control section.

32. The communication device according to claim 29, wherein the device itself provides in advance the reception control section with key information for verifying, using an electronic signature function, whether information to be transmitted from the device itself to the main network is proper information.

33. The communication device according to claim 29, wherein the device itself confirms connection destination in the check-in-network when connection to the check-in-network connection is detected, triggered by connection of the device itself to the check-in-network, and performs automatic discovery configuration of required information to the reception control section of the confirmed connection destination.

34. The communication device according to claim 29, wherein, when the device itself connects to the check-in-network without being loaded with a tool for qualification screening, Web access from the device itself is guided by the reception control section to a download site of the tool for qualification screening, and the device itself downloads and installs the tool for qualification screening from the download site.

35. The communication device according to claim 34, wherein, in the event that a new tool for qualification screening exists on the download site when connecting to the check-in-network, the device itself downloads and executes the new tool for qualification screening.

36. The communication device according to claim 34, wherein the tool for qualification screening confirms existence of updated information on the download site when the device itself connects to the check-in-network, and downloads the updated information if such information exists.

37. The communication device according to claim 34, wherein the device itself is a device loaded with the tool.

38. The communication device according to claim 29, wherein, in the event that the device itself is incapable of being loaded with the tool for qualification screening, the reception control section confirms the type of the device itself and sets information at the device itself according to confirmation results.

39. The communication device according to claim 38, wherein the information to be set at the device itself is information for enabling the device itself to operate on the main network.

40. The communication device according to claim 29, wherein the main network and the check-in-network are respectively at least either the VLAN (Virtual LAN [Local Area Network]) or the VPN (Virtual Private Network).

41. A network connection method used in a communication system that includes a main network that provides various services, a check-in-network provided independently from the main network, a reception control section connected to the main network and the check-in-network, a plurality of ports including at least ports a through h, a communication device, each port c-h being configured to connect the communication device to the main network and to port b via the check-in-network on a one-on-one basis, the reception control section being connected to the main network via port a, and the reception control section controls switching of the connect of the communication device to the main network, and a hub that is incapable of mutually connecting communication devices respectively connected to ports c to h, the method comprising the steps of:

performing quarantine connection of the communication device on a one-on-one basis to the reception control section via the check-in-network when the communication device requests connection to the main network;

having the reception control section acquire status information of the quarantine-connected communication device on a one-on-one basis to perform qualification screening in order to determine whether the status satisfies preset qualification requirements; and connecting the check-in-network, that the communication device is connected to, to the main network upon determination that the qualification requirements are satisfied, wherein the qualification screening/setting is executed in a VLAN or a VPN at a layer lower than a network layer of an Open System Interconnect model upon status change of a link.

42. A network connection method used in a communication system that includes a plurality of main networks that provide various services, a check-in-network provided independently from the main networks, a reception control section connected to the main networks and the check-in-network, a plurality of ports including at least ports a through h, a communication device, each port c-h being configured to connect the communication device to at least one main network and to port b via the check-in-network on a one-on-one basis, the reception control section being connected to the at least one main network via port a, and the reception control section controls switching of the connect of the communication device to the at least one main network from port b, and a hub that is incapable of mutually connecting communication devices respectively connected to ports c to h, the method comprising the steps of:

performing quarantine connection of the communication device on a one-on-one basis to the reception control section via the network for qualification screening/setting when the communication device requests connection to the main network;

having the reception control section acquire status information of the quarantine-connected communication device on a one-on-one basis to perform qualification screening in order to determine whether the status satisfies preset qualification requirements; and selectively connecting the check-in-network, that the communication device is connected to, to one of the main networks according to the qualification requirements upon determination that the qualification requirements are satisfied, wherein the qualification screening/setting is executed in a VLAN or a VPN at a layer lower than a network layer of an Open System Interconnect model upon status change of a link.

43. The network connection method according to claim 41, wherein the reception control section provides in advance the quarantine-connected communication device with key information for verifying, using an electronic signature function, whether information to be acquired from the main network is proper information.

44. The network connection method according to claim 41, wherein the communication device provides in advance the quarantine-connected reception control section with key information for verifying, using an electronic signature function, whether information to be transmitted from the device itself to the main network is proper information.

45. The network connection method according to claim 41, wherein the communication device confirms connection destination in the check-in-network when connection to the check-in-network connection is detected, triggered by connection of the device itself to the check-in-network connection, and performs automatic discovery configuration of required information to the reception control section of the confirmed connection destination.

46. The network connection method according to claim 41, wherein the reception control section returns the communication device to a quarantine-connection setting when the communication device is disconnected from the main network.

47. The network connection method according to claim 41, wherein, when the communication device connects to the check-in-network without being loaded with a tool for qualification screening, the reception control section guides Web access from the communication device to a download site of the tool for qualification screening, and the communication device downloads and installs the tool for qualification screening from the download site.

48. The network connection method according to claim 47, wherein, in the event that a new tool for qualification screening exists on the download site when connecting to the check-in-network, the communication device downloads and executes the new tool for qualification screening.

49. The network connection method according to claim 47, wherein the tool for qualification screening confirms existence of updated information on the download site when the communication device connects to the check-in-network, and downloads the updated information if such information exists.

50. The network connection method according to claim 41, wherein the reception control section connects all communication devices to the check-in-network when events regarding the main network match requirements set in advance from the outside.

51. The network connection method according to claim 41, wherein the communication device is a communication device loaded with the tool.

52. The network connection method according to claim 41, wherein the reception control section confirms the type of communication device when such device is incapable of being loaded with the tool for qualification screening, and sets information at the communication device according to confirmation results.

53. The network connection method according to claim 52, wherein the information to be set at the communication device is information for enabling the communication device to operate on the main network.

54. The network connection method according to claim 41, wherein the main network and the network for qualification screening/setting are respectively at least either the VLAN (Virtual LAN [Local Area Network]) or the VPN (Virtual Private Network).

55. A non-transitory computer readable storage medium with a computer program stored thereon, the computer program for a network connection method, used in a communication system that includes a main network that provides various services, a check-in-network provided independently from the main network, a reception control section connected to the main network and the check-in-network, a plurality of ports including at least ports a through h, a communication device, each port c-h being configured to connect the communication device to the main network and to port b via a check-in-network on a one-on-one basis, the reception control section being connected to the main network via port a, and the reception control section controls switching of the connect of the communication device to the main network from port b, and a hub that is incapable of mutually connecting communication devices respectively connected to ports c to h, the computer program performing the network connection method comprising:

performing quarantine connection of the communication device on a one-on-one basis to the reception control section via the check-in-network when the communication device requests connection to the main network; and acquiring via the reception control section status information of the quarantine-connected communication device on a one-on-one basis to perform qualification screening in order to determine whether the status satisfies preset qualification requirements, and connect the check-in-network, that the communication device is connected to, to the main network being determined that the qualification requirements are satisfied, wherein the qualification screening/setting is executed in a VLAN or a VPN at a layer lower than a network layer of an Open System Interconnect model upon status change of a link.

56. A non-transitory computer readable storage medium with a computer program stored state thereon, the computer program for a network connection method, used in a communication system that includes a plurality of main networks that provide various services, a check-in-network provided independently from the main networks, a reception control section connected to the main networks and the network for qualification screening/setting, a plurality of ports including at least ports a through h, a communication device, each port c-h being configured to connect the communication device to at least one main network and to port b via the check-in-network on a one-on-one basis, the reception control section being connected to the at least one main network via port a, and the reception control section controls switching of the connect of the communication device to the at least one main network from port b, and a hub that is incapable of mutually connecting communication devices respectively connected to ports c to h, the program comprising:

performing quarantine connection of the communication device on a one-on-one basis to the reception control section via the check-in-network when the communication device requests connection to the main networks; and acquiring via the reception control section status information of the quarantine-connected communication device on a one-on-one basis to perform qualification screening in order to determine whether the status satisfies preset qualification requirements, and selectively connect the check-in-network, that the communication device is connected to, to one of the main networks according to the qualification requirements upon determination that the qualification requirements are satisfied, wherein the qualification screening/setting is executed in a VLAN or a VPN at a layer lower than a network layer of an Open System Interconnect model upon status change of a link.

\* \* \* \* \*